(12) United States Patent
Yerramalli et al.

(10) Patent No.: US 10,412,755 B2
(45) Date of Patent: Sep. 10, 2019

(54) TECHNIQUES FOR CONFIGURING UPLINK TRANSMISSIONS IN A SHARED RADIO FREQUENCY SPECTRUM BAND

(71) Applicant: QUALCOMM Incorporated, San Diego, CA (US)

(72) Inventors: Srinivas Yerramalli, San Diego, CA (US); Aleksandar Damnjanovic, Del Mar, CA (US); Peter Gaal, San Diego, CA (US); Juan Montojo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/467,697

(22) Filed: Mar. 23, 2017

(65) Prior Publication Data

US 2017/0280476 A1 Sep. 28, 2017

Related U.S. Application Data

(60) Provisional application No. 62/313,618, filed on Mar. 25, 2016.

(51) Int. Cl.
*H04W 72/12* (2009.01)
*H04W 16/14* (2009.01)
(Continued)

(52) U.S. Cl.
CPC ....... *H04W 72/1268* (2013.01); *H04W 16/14* (2013.01); *H04W 72/0453* (2013.01);
(Continued)

(58) Field of Classification Search
CPC ............. H04W 16/14; H04W 72/0453; H04W 72/1268; H04W 72/14; H04W 74/0808; H04W 84/12
See application file for complete search history.

(56) References Cited

U.S. PATENT DOCUMENTS

| 2008/0225791 | A1* | 9/2008 | Pi ........................ H04B 7/0417 370/330 |
| 2017/0230972 | A1* | 8/2017 | Wang ................ H04W 72/0446 |
| 2017/0237592 | A1* | 8/2017 | Yang .................... H04B 7/0639 375/260 |

FOREIGN PATENT DOCUMENTS

EP 2991240 A1 3/2016

OTHER PUBLICATIONS

Ericsson, "Uplink Resource Allocation Design for Enhanced LAA," 3GPP TSG-RAN WG1 Meeting #84, R1-160994, St. Julian's, Malta, Feb. 15-19, 2016, 3 pgs., XP051064478, 3rd Generation Partnership Project.

(Continued)

*Primary Examiner* — Steven H Nguyen
(74) *Attorney, Agent, or Firm* — Dalei Dong; Holland & Hart LLP

(57) ABSTRACT

Techniques are described for wireless communication. One method includes identifying a first set of resources for a first uplink transmission. The first set of resources is based on a first set of frequency resource interlaces and a first set of frequency resource interlace segments. Each frequency resource interlace segment of the first set of frequency resource interlace segments includes a portion of resources of the frequency resource interlaces of the first set of frequency resource interlaces. The method also includes communicating on an uplink using the first set of resources.

24 Claims, 26 Drawing Sheets

(51) Int. Cl.
    *H04W 72/04*   (2009.01)
    *H04W 72/14*   (2009.01)
    *H04W 74/08*   (2009.01)
    *H04W 84/12*   (2009.01)
(52) U.S. Cl.
    CPC ....... *H04W 72/14* (2013.01); *H04W 74/0808* (2013.01); *H04W 84/12* (2013.01)

(56) References Cited

OTHER PUBLICATIONS

ISA/EP, International Search Report and Written Opinion of the International Searching Authority, Int'l Application No. PCT/US2017/024089, dated Sep. 7, 2017, European Patent Office, Rijswijk, NL, 21 pgs.

NTT DOCOMO et al., "Discussion on SRS Design for eLAA UL," 3GPP TSG RAN WG1 Meeting #84, R1-160948, St. Julian's, Malta, Feb. 15-19, 2016, 3 pgs., XP051054256, 3rd Generation Partnership Project.

ISA/EPO, Partial International Search Report of the International Searching Authority, Int'l. App. No. PCT/US2017/024089, dated Jul. 3, 2017, European Patent Office, Rijswijk, NL, 14 pgs.

\* cited by examiner

TECHNIQUES FOR CONFIGURING UPLINK TRANSMISSIONS IN A SHARED RADIO FREQUENCY SPECTRUM BAND

CROSS REFERENCES

The present application for patent claims priority to U.S. Provisional Patent Application No. 62/313,618 by Yerramalli, et al., entitled "TECHNIQUES FOR CONFIGURING UPLINK TRANSMISSIONS IN A SHARED RADIO FREQUENCY SPECTRUM BAND," filed Mar. 25, 2016, assigned to the assignee hereof, and is hereby expressly incorporated by reference herein in its entirety.

BACKGROUND

Field of the Disclosure

The present disclosure, for example, relates to wireless communication systems, and more particularly to techniques for configuring uplink transmissions in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communication between a base station and a UE over a shared radio frequency spectrum band, or over different spectrums (e.g., a dedicated radio frequency spectrum band and a shared radio frequency spectrum band). With increasing data traffic in cellular networks that use a dedicated radio frequency spectrum band, offloading of at least some data traffic to a shared radio frequency spectrum band may provide a mobile network operator (or cellular operator) with opportunities for enhanced data transmission capacity. Use of a shared radio frequency spectrum band may also provide service in areas where access to a dedicated radio frequency spectrum band is unavailable.

SUMMARY

When a transmitting an uplink transmission in a shared radio frequency spectrum band, resources may be configured for the uplink transmission using techniques that satisfy a minimum bandwidth occupancy requirement in the shared radio frequency spectrum band. However, scenarios may arise in which the minimum bandwidth occupancy requirement does not need to be met (or does not exist). In these scenarios, it may be useful to allocate or configure resources in other ways (e.g., as a contiguous block of resources, or in a narrow band). Techniques described in the present disclosure may enable resources to be configured for uplink transmissions in different ways, to satisfy different resource allocation requirements or goals. Techniques described in the present disclosure may also provide flexibility in configuring resources for multiple-transmission time interval (TTI) uplink transmissions.

In one example, a method for wireless communication is described. The method may include identifying a first set of resources for a first uplink transmission. The first set of resources may be based at least in part on a first set of frequency resource interlaces and a first set of frequency resource interlace segments. Each frequency resource interlace segment of the first set of frequency resource interlace segments may include a portion of resources of the frequency resource interlaces of the first set of frequency resource interlaces. The method may also include communicating on an uplink using the first set of resources.

In some examples, the method may include receiving a first uplink grant for the first uplink transmission, and the first set of resources for the first uplink transmission may be identified in the first uplink grant. In some examples, the first set of resources for the first uplink transmission may be identified in a field of the first uplink grant may include one bit per frequency resource interlace and one bit per frequency resource interlace segment. In some examples, the method may include scheduling the first uplink transmission of a first UE, and transmitting a first uplink grant for the first uplink transmission to the first UE. In these examples, the first set of resources for the first uplink transmission may be identified in the first uplink grant for the first uplink transmission. In some examples, the first set of resources for the first uplink transmission may be identified in a field of the first uplink grant including one bit per frequency resource interlace and one bit per frequency resource interlace segment. In some examples, the method may include scheduling a second uplink transmission of a second UE, in which the second uplink transmission is scheduled for a same TTI as the first uplink transmission; identifying a second set of resources for the second uplink transmission, in which the second set of resources is based at least in part on a second set of frequency resource interlaces and a second set of frequency resource interlace segments, and in which each frequency resource interlace segment of the second set of frequency resource interlace segments includes a portion of resources of the frequency resource interlaces of the second set of frequency resource interlaces; and transmitting a second uplink grant for the second uplink transmission to the second UE. In these examples, the second set of resources for the second uplink transmission may be identified in the second uplink grant for the second uplink transmission. In some examples, the first set of frequency resource interlaces may include all frequency resource interlaces, the first set of frequency resource interlace segments may include a subset of frequency resource interlace segments, and the second set of frequency resource interlaces may include a subset of the frequency resource interlaces.

In some examples of the method, each frequency resource interlace segment may include at least one resource in each of the frequency resource interlaces. In some examples, the first set of resources may include a first set of resource blocks. In some examples, each of the frequency resource interlace segments may include a same number of resource blocks in each of the frequency resource interlaces. In some examples, the first set of frequency resource interlaces may include all frequency resource interlaces, and the first set of frequency resource interlace segments may include a subset of frequency resource interlace segments. In some examples, the frequency resource interlace segments may include one of: frequency resource interlace segments having equal numbers of resources blocks, or frequency resource interlace segments having at least two different numbers of resource blocks. In some examples, the first uplink transmission may include: a physical uplink shared channel (PUSCH) transmission, or a physical uplink control channel (PUCCH) transmission, or a physical random access channel (PRACH) transmission, or a sounding reference signal (SRS) transmission, or a combination thereof. In some examples, the first set of resources may be in a shared radio frequency spectrum band.

In one example, an apparatus for wireless communication is described. The apparatus may include means for identifying a first set of resources for a first uplink transmission. The first set of resources may be based at least in part on a first set of frequency resource interlaces and a first set of frequency resource interlace segments. Each frequency resource interlace segment of the first set of frequency resource interlace segments may include a portion of resources of the frequency resource interlaces of the first set of frequency resource interlaces. The apparatus may also include means for communicating on an uplink using the first set of resources.

In some examples, the apparatus may include means for receiving a first uplink grant for the first uplink transmission, and the first set of resources for the first uplink transmission may be identified in the first uplink grant. In some examples, the first set of resources for the first uplink transmission may be identified in a field of the first uplink grant including one bit per frequency resource interlace and one bit per frequency resource interlace segment. In some examples, the apparatus may include means for scheduling the first uplink transmission of a first UE, and means for transmitting a first uplink grant for the first uplink transmission to the first UE. In these examples, the first set of resources for the first uplink transmission may be identified in the first uplink grant for the first uplink transmission. In some examples, the first set of resources for the first uplink transmission may be identified in a field of the first uplink grant including one bit per frequency resource interlace and one bit per frequency resource interlace segment. In some examples, the apparatus may include means for scheduling a second uplink transmission of a second UE, in which the second uplink transmission is scheduled for a same TTI as the first uplink transmission; means for identifying a second set of resources for the second uplink transmission, in which the second set of resources is based at least in part on a second set of frequency resource interlaces and a second set of frequency resource interlace segments, and in which each frequency resource interlace segment of the second set of frequency resource interlace segments includes a portion of resources of the frequency resource interlaces of the second set of frequency resource interlaces; and means for transmitting a second uplink grant for the second uplink transmission to the second UE. In these examples, the second set of resources for the second uplink transmission may be identified in the second uplink grant for the second uplink transmission. In some examples, the first set of frequency resource interlaces may include all frequency resource interlaces, the first set of frequency resource interlace segments may include a subset of frequency resource interlace segments, and the second set of frequency resource interlaces may include a subset of the frequency resource interlaces.

In some examples of the apparatus, each frequency resource interlace segment may include at least one resource in each of the frequency resource interlaces. In some examples, the first set of resources may include a first set of resource blocks. In some examples, each of the frequency resource interlace segments may include a same number of resource blocks in each of the frequency resource interlaces. In some examples, the first set of frequency resource interlaces may include all frequency resource interlaces, and the first set of frequency resource interlace segments may include a subset of frequency resource interlace segments. In some examples, the frequency resource interlace segments may include one of: frequency resource interlace segments having equal numbers of resources blocks, or frequency resource interlace segments having at least two different numbers of resource blocks. In some examples, the first uplink transmission may include: a PUSCH transmission, or a PUCCH transmission, or a PRACH transmission, or a SRS transmission, or a combination thereof. In some examples, the first set of resources may be in a shared radio frequency spectrum band.

In one example, another apparatus for wireless communication is described. The apparatus may include a processor, and memory in electronic communication with the processor. The processor and the memory may be configured to identify a first set of resources for a first uplink transmission. The first set of resources may be based at least in part on a first set of frequency resource interlaces and a first set of frequency resource interlace segments. Each frequency resource interlace segment of the first set of frequency resource interlace segments may include a portion of resources of the frequency resource interlaces of the first set of frequency resource interlaces. The processor and the memory may also be configured to communicate on an uplink using the first set of resources.

In one example, a non-transitory computer-readable medium storing computer-executable code for wireless communication is described. The code may be executable by a processor to identify a first set of resources for a first uplink transmission. The first set of resources may be based at least in part on a first set of frequency resource interlaces and a first set of frequency resource interlace segments. Each frequency resource interlace segment of the first set of frequency resource interlace segments may include a portion of resources of the frequency resource interlaces of the first set of frequency resource interlaces. The code may also be executable by the processor to communicate on an uplink using the first set of resources.

In one example, another method for wireless communication is described. The method may include identifying, in an uplink grant for at least one TTI of a multiple-TTI uplink transmission of a UE, downlink control information (DCI) including: a reference signal and PUSCH multiplexing indicator, or a resource reuse indicator, or a PUSCH transmission skipping strategy, or a combination thereof; and communicating on an uplink, during the multiple-TTI uplink transmission, in accordance with the DCI.

In some examples, the method may include scheduling the multiple-TTI uplink transmission of the UE, and transmitting the uplink grant for the at least one TTI of the multiple-TTI uplink transmission to the UE. In some examples, the reference signal and PUSCH multiplexing indicator may indicate to the UE to: not transmit a SRS and begin a PUSCH transmission during a first symbol period following a successful performance of a listen before talk (LBT) procedure; or transmit the SRS during the first symbol period and begin the PUSCH transmission during a second symbol period temporally following the first symbol period; or transmit a junk SRS during the first symbol period and begin the PUSCH transmission during the second symbol period. In some examples, the resource reuse indicator may indicate to the UE whether at least one of PUCCH resources or PRACH resources are reallocated as PUSCH resources. In some examples, the PUSCH transmission skipping strategy may indicate to the UE whether to skip at least a temporally first PUSCH transmission or at least a temporally last PUSCH transmission when a LBT procedure for at least a first TTI is not successful. In some examples, the DCI may further include a current transmission burst index and a target transmission burst index, in which the current transmission burst index identifies a first transmission burst in which the uplink grant is transmitted, and the target transmission burst index identifies a second transmission burst to which the uplink grant applies. In some examples, the method may include broadcasting the current transmission burst index, to a plurality of UEs, in DCI on a common physical downlink control channel (PDCCH). In some examples, the DCI may further include an uplink index identifying an uplink TTI in the second transmission burst in which a PUSCH transmission begins.

In one example, another apparatus for wireless communication is described. The apparatus may include means for identifying, in an uplink grant for at least one TTI of a multiple-TTI uplink transmission of a UE, DCI including: a reference signal and PUSCH multiplexing indicator, or a resource reuse indicator, or a PUSCH transmission skipping strategy, or a combination thereof; and means for communicating on an uplink, during the multiple-TTI uplink transmission, in accordance with the DCI.

In some examples, the apparatus may include means for scheduling the multiple-TTI uplink transmission of the UE, and means for transmitting the uplink grant for the at least one TTI of the multiple-TTI uplink transmission to the UE. In some examples, the reference signal and PUSCH multiplexing indicator may indicate to the UE to: not transmit a SRS and begin a PUSCH transmission during a first symbol period following a successful performance of a LBT procedure; or transmit the SRS during the first symbol period and begin the PUSCH transmission during a second symbol period temporally following the first symbol period; or transmit a junk SRS during the first symbol period and begin the PUSCH transmission during the second symbol period. In some examples, the resource reuse indicator may indicate to the UE whether at least one of PUCCH resources or PRACH resources are reallocated as PUSCH resources. In some examples, the PUSCH transmission skipping strategy may indicate to the UE whether to skip at least a temporally first PUSCH transmission or at least a temporally last PUSCH transmission when a LBT procedure for at least a first TTI is not successful. In some examples, the DCI may, additionally or alternatively, include a current transmission burst index and a target transmission burst index, in which the current transmission burst index identifies a first transmission burst in which the uplink grant is transmitted, and the target transmission burst index identifies a second transmission burst to which the uplink grant applies. In some examples, the apparatus may include means for broadcasting the current transmission burst index, to a plurality of UEs, in DCI on a common PDCCH. In some examples, the DCI may, additionally or alternatively, include an uplink index identifying an uplink TTI in the second transmission burst in which a PUSCH transmission begins.

In one example, another apparatus for wireless communication is described. The apparatus may include a processor, and memory in electronic communication with the processor. The processor and the memory may be configured to identify, in an uplink grant for at least one TTI of a multiple-TTI uplink transmission of a UE, DCI including: a reference signal and PUSCH multiplexing indicator, or a resource reuse indicator, or a PUSCH transmission skipping strategy, or a combination thereof; and to communicate on an uplink, during the multiple-TTI uplink transmission, in accordance with the DCI.

In one example, another non-transitory computer-readable medium storing computer-executable code for wireless communication is described. The code may be executable by a processor to identify, in an uplink grant for at least one TTI of a multiple-TTI uplink transmission of a UE, DCI including: a reference signal and PUSCH multiplexing indicator, or a resource reuse indicator, or a PUSCH transmission skipping strategy, or a combination thereof; and to communicate on an uplink, during the multiple-TTI uplink transmission, in accordance with the DCI.

In one example, a method for wireless communication at a UE is described. The method may include receiving at least one uplink grant for at least one TTI of a multiple-TTI uplink transmission in a shared radio frequency spectrum band; performing a LBT procedure to contend for access to the shared radio frequency spectrum band for a TTI of the multiple-TTI uplink transmission; and triggering, upon losing contention for access to the shared radio frequency spectrum band for the TTI, an uplink transmission carryover strategy.

In some examples of the method, the uplink transmission carryover strategy may indicate to the UE to carryover or not carryover, to a next TTI of the multiple-TTI uplink transmission, a parameter associated with the TTI for which contention for access to the shared radio frequency spectrum band is lost. In some examples, the parameter may include: a channel state information (CSI) transmission parameter, or a SRS transmission parameter, or a transmit power control (TPC) command, or a combination thereof.

In one example, an apparatus for wireless communication at a UE is described. The apparatus may include means for receiving at least one uplink grant for at least one TTI of a multiple-TTI uplink transmission in a shared radio frequency spectrum band; means for performing a LBT procedure to contend for access to the shared radio frequency spectrum band for a TTI of the multiple-TTI uplink transmission; and means for triggering, upon losing contention for access to the shared radio frequency spectrum band for the TTI, an uplink transmission carryover strategy.

In some examples of the apparatus, the uplink transmission carryover strategy may indicate to the UE to carryover or not carryover, to a next TTI of the multiple-TTI uplink transmission, a parameter associated with the TTI for which contention for access to the shared radio frequency spectrum band is lost. In some examples, the parameter may include: a CSI transmission parameter, or a SRS transmission parameter, or a TPC command, or a combination thereof.

In one example, another apparatus for wireless communication at a UE is described. The apparatus may include a processor, and memory in electronic communication with the processor. The processor and the memory may be configured to receive at least one uplink grant for at least one TTI of a multiple-TTI uplink transmission in a shared radio frequency spectrum band; to perform a LBT procedure to contend for access to the shared radio frequency spectrum band for a TTI of the multiple-TTI uplink transmission; and to trigger, upon losing contention for access to the shared radio frequency spectrum band for the TTI, an uplink transmission carryover strategy.

In one example, a non-transitory computer-readable medium storing computer-executable code for wireless communication at a UE is described. The code may be executable by a processor to receive at least one uplink grant for at least one TTI of a multiple-TTI uplink transmission in a shared radio frequency spectrum band; to perform a LBT procedure to contend for access to the shared radio frequency spectrum band for a TTI of the multiple-TTI uplink transmission; and to trigger, upon losing contention for access to the shared radio frequency spectrum band for the TTI, an uplink transmission carryover strategy.

In one example, another method for wireless communication at a UE is described. The method may include receiving an uplink grant for an uplink transmission period in a shared radio frequency spectrum band; performing, during a first portion of a temporally first symbol period of the uplink transmission period, a LBT procedure to contend for access to the shared radio frequency spectrum band; selecting, upon winning contention for access to the shared radio frequency spectrum band, a channel reservation signal to transmit during a second portion of the temporally first symbol period of the uplink transmission period; and transmitting the selected channel reservation signal during the second portion of the temporally first symbol period of the uplink transmission period.

In some examples of the method, selecting the channel reservation signal may include selecting a SRS waveform when the UE is scheduled to transmit a SRS before a PUSCH during the uplink transmission period. In some examples, selecting the channel reservation signal may include selecting a junk SRS waveform when the UE is scheduled to transmit a PUSCH but not a SRS during the uplink transmission period, and when a junk SRS interface is active during the temporally first symbol period of the uplink transmission period. In some examples, selecting the channel reservation signal may include selecting a Wi-Fi channel reservation signal when a network access device that transmits the uplink grant does not indicate a selection methodology for selecting the channel reservation signal.

In one example, another apparatus for wireless communication at a UE is described. The apparatus may include means for receiving an uplink grant for an uplink transmission period in a shared radio frequency spectrum band; means for performing, during a first portion of a temporally first symbol period of the uplink transmission period, a LBT procedure to contend for access to the shared radio frequency spectrum band; means for selecting, upon winning contention for access to the shared radio frequency spectrum band, a channel reservation signal to transmit during a second portion of the temporally first symbol period of the uplink transmission period; and means for transmitting the selected channel reservation signal during the second portion of the temporally first symbol period of the uplink transmission period.

In some examples of the apparatus, the means for selecting the channel reservation signal may include means for selecting a SRS waveform when the UE is scheduled to transmit a SRS before a PUSCH during the uplink transmission period. In some examples, the means for selecting the channel reservation signal may include means for selecting a junk SRS waveform when the UE is scheduled to transmit a PUSCH but not a SRS during the uplink transmission period, and when a junk SRS interface is active during the temporally first symbol period of the uplink transmission period. In some examples, the means for selecting the channel reservation signal may include means for selecting a Wi-Fi channel reservation signal when a network access device that transmits the uplink grant does not indicate a selection methodology for selecting the channel reservation signal.

In one example, another apparatus for wireless communication at a UE is described. The apparatus may include a processor, and memory in electronic communication with the processor. The processor and the memory may be configured to receive an uplink grant for an uplink transmission period in a shared radio frequency spectrum band; to perform, during a first portion of a temporally first symbol period of the uplink transmission period, a LBT procedure to contend for access to the shared radio frequency spectrum band; to select, upon winning contention for access to the shared radio frequency spectrum band, a channel reservation signal to transmit during a second portion of the temporally first symbol period of the uplink transmission period; and to transmit the selected channel reservation signal during the second portion of the temporally first symbol period of the uplink transmission period.

In one example, another non-transitory computer-readable medium storing computer-executable code for wireless communication at a UE is described. The code may be executable by a processor to receive an uplink grant for an uplink transmission period in a shared radio frequency spectrum band; to perform, during a first portion of a temporally first symbol period of the uplink transmission period, a LBT procedure to contend for access to the shared radio frequency spectrum band; to select, upon winning contention for access to the shared radio frequency spectrum band, a channel reservation signal to transmit during a second portion of the temporally first symbol period of the uplink transmission period; and to transmit the selected channel reservation signal during the second portion of the temporally first symbol period of the uplink transmission period.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which a shared radio frequency spectrum band may be used for at least a portion of communications in a wireless communication system. In some examples, the shared radio frequency spectrum band may be used for Long Term Evolution (LTE) or LTE-Advanced (LTE-A) communications. The shared radio frequency spectrum band may be used in combination with, or independent from, a dedicated radio frequency spectrum band. The dedicated radio frequency spectrum band may include a radio frequency spectrum band licensed to particular users for particular uses. The shared radio frequency spectrum band may include a radio frequency spectrum band available for Wi-Fi use, a radio frequency spectrum band available for use by different radio access technologies, or a radio frequency spectrum band available for use by multiple mobile network operators (MNOs) in an equally shared or prioritized manner.

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. Before communicating over a shared radio frequency spectrum band, a transmitting apparatus may perform a listen before talk (LBT) procedure to contend for access to the shared radio frequency spectrum band. Such a LBT procedure may include performing a clear channel assessment (CCA) procedure (or extended CCA procedure) to determine whether a channel of the shared radio frequency spectrum band is available. When it is determined that the channel of the shared radio frequency spectrum band is available, a channel reservation signal (e.g., a channel usage beacon signal (CUBS)) may be transmitted to reserve the channel. When it is determined that a channel is not available, a CCA procedure (or extended CCA procedure) may be performed for the channel again at a later time.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
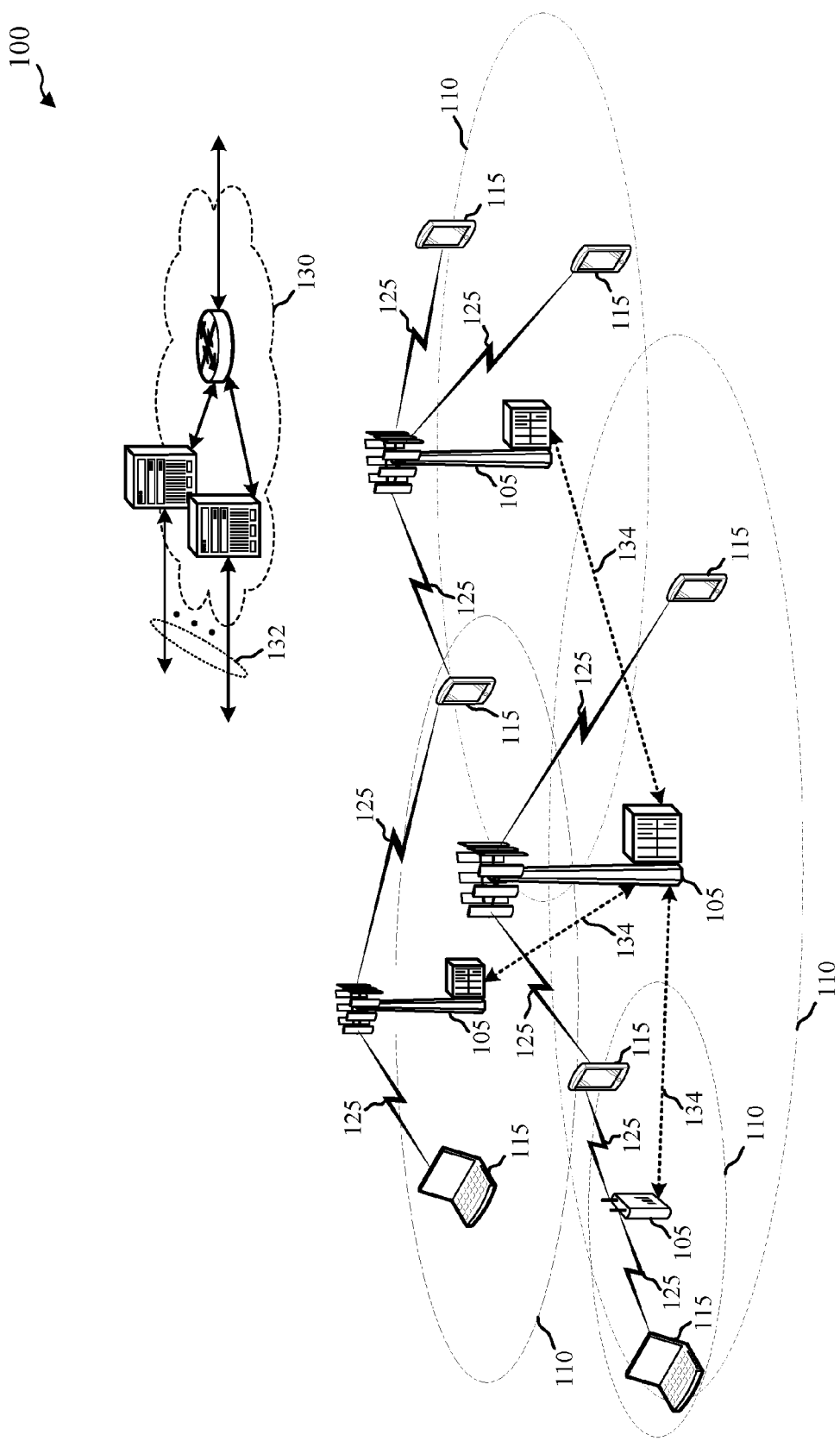
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include network access devices (e.g., base stations 105), UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base stations. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlinks (DLs), from a base station 105 to a UE 115, or uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105, or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may support operation over a dedicated radio frequency spectrum band (e.g., a radio frequency spectrum band licensed to particular users for particular uses) or a shared radio frequency spectrum band (e.g., a radio frequency spectrum band that is available for Wi-Fi use, a radio frequency spectrum band that is available for use by different radio access technologies, or a radio frequency spectrum band that is available for use by multiple MNOs in an equally shared or prioritized manner).

Figure 2:
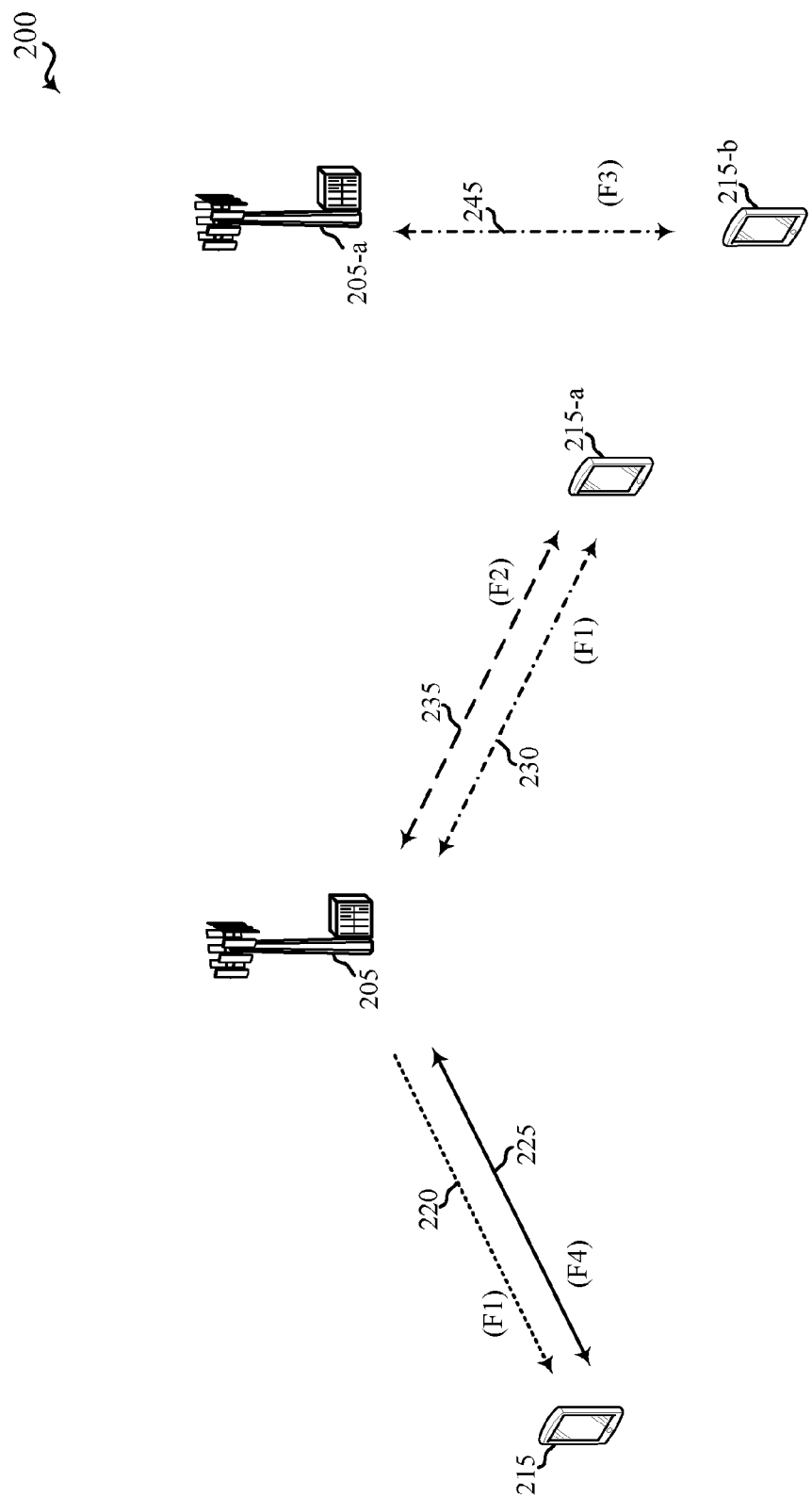
FIG. 2 shows a wireless communication system in which LTE/LTE-A may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode (also referred to as a first licensed assisted access (LAA) mode), a carrier aggregation mode (also referred to as a second licensed assisted access mode), and a standalone mode, in which LTE/LTE-A is deployed using at least a shared radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, and a third UE 215-b may be examples of aspects of one or more of the UEs 115 described with reference to FIG. 1.

In the example of the supplemental downlink mode (e.g., the first licensed assisted access mode) in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a MNO) that uses a dedicated radio frequency spectrum band and needs to relieve some of the traffic or signaling congestion.

In the example of the carrier aggregation mode (e.g., the second licensed assisted access mode) in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in a shared radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a dedicated radio frequency spectrum band. The third bidirectional link 235 may provide a downlink and uplink capacity offload for the first base station 205. Like the supplemental downlink mode (e.g., the first licensed assisted access mode) described above, this scenario may occur with any service provider (e.g., MNO) that uses a dedicated radio frequency spectrum band and needs to relieve some of the traffic or signaling congestion.

As described above, one type of service provider that may benefit from the capacity offload offered by using LTE/LTE-A in shared radio frequency spectrum band is a traditional MNO having access rights to an LTE/LTE-A dedicated radio frequency spectrum band. For these service providers, an operational example may include a bootstrapped mode (e.g., supplemental downlink, carrier aggregation) that uses the LTE/LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via the third bidirectional link 235) while data may, for example, be communicated in the shared radio frequency spectrum band (e.g., via second bidirectional link 230). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the third UE 215-b using a bidirectional link 245 and may receive OFDMA waveforms, SC-FDMA waveforms, or resource block interleaved FDMA waveforms from the third UE 215-b using the bidirectional link 245. The bidirectional link 245 may be associated with the frequency F3 in a shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-*a* described with reference to FIG. 1 or 2, or one of the UEs 115, 215, 215-*a*, or 215-*b* described with reference to FIG. 1 or 2, may use a gating interval to gain access to a wireless channel of a shared radio frequency spectrum band (e.g., to a physical channel of the shared radio frequency spectrum band). In some examples, the gating interval may be synchronous and periodic. For example, the periodic gating interval may be synchronized with at least one boundary of an LTE/LTE-A radio frame interval. In other examples, the gating interval may be asynchronous. The gating interval may define the application of a contention-based protocol, such as a LBT protocol based on the LBT protocol specified in European Telecommunications Standards Institute (ETSI) (EN 301 893). When using a gating interval that defines the application of a LBT protocol, the gating interval may indicate when a transmitting apparatus needs to perform a contention procedure (e.g., a LBT procedure) such as a clear channel assessment (CCA) procedure or an extended CCA (ECCA) procedure. The outcome of the CCA procedure or ECCA procedure may indicate to the transmitting apparatus whether a wireless channel of an shared radio frequency spectrum band is available or in use for the gating interval (e.g., a LBT radio frame or transmission burst). When a CCA procedure or ECCA procedure indicates the wireless channel is available for a corresponding LBT radio frame or transmission burst (e.g., "clear" for use), the transmitting apparatus may reserve or use the wireless channel of the shared radio frequency spectrum band during part or all of the LBT radio frame. When a CCA procedure or ECCA procedure indicates the wireless channel is not available (e.g., that the wireless channel is in use or reserved by another transmitting apparatus), the transmitting apparatus may be prevented from using the wireless channel during the LBT radio frame. In some examples, a transmitting apparatus may need to perform a CCA procedure or ECCA procedure for some but not other wireless channels in a shared radio frequency spectrum band.

Figure 3:
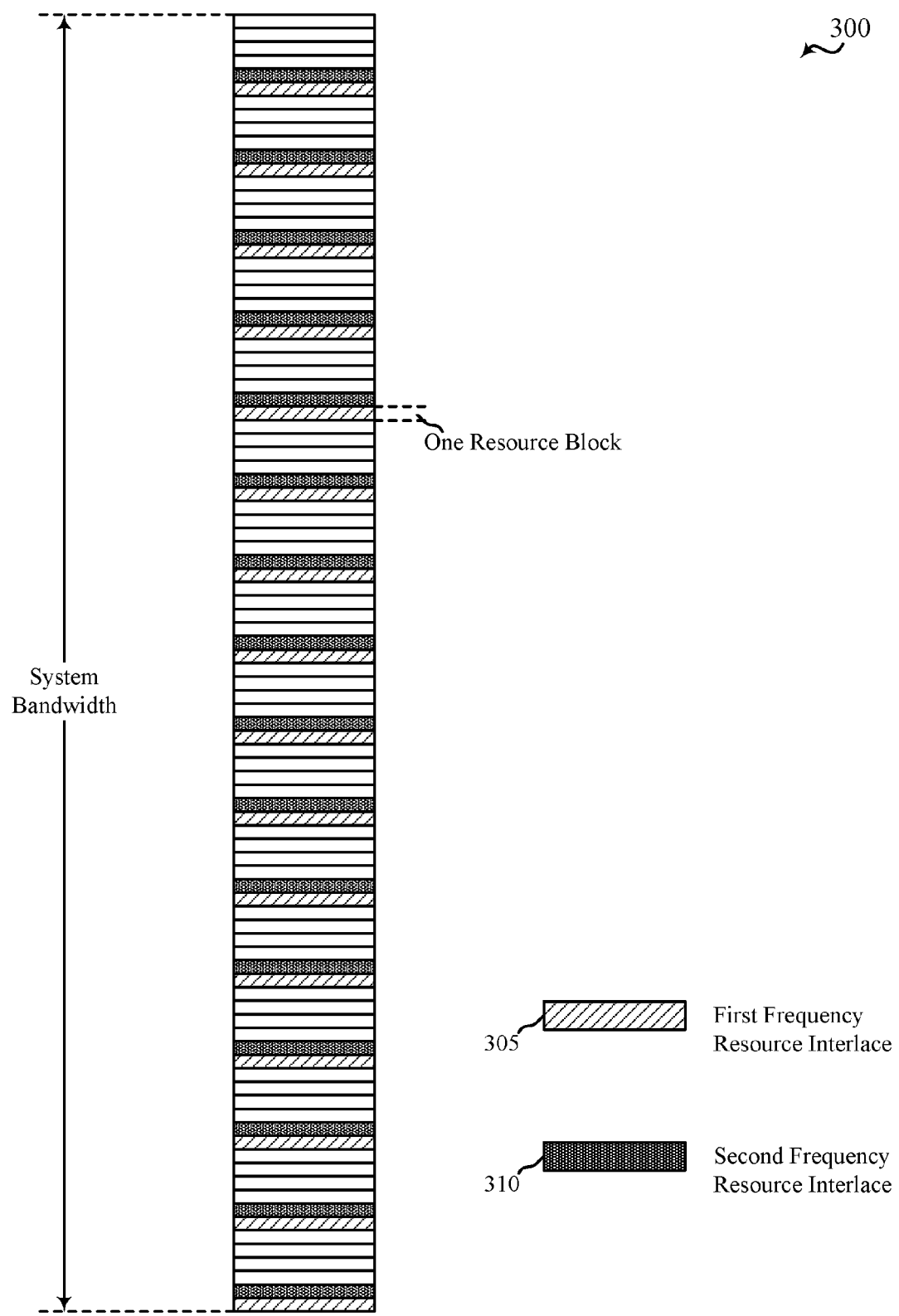
FIG. 3 shows a plurality of resource blocks of a system bandwidth, which resource blocks may be allocated in a plurality of frequency resource interlaces, in accordance with various aspects of the present disclosure.

FIG. 3 shows a plurality of resource blocks 300 of a system bandwidth, which resource blocks 300 may be allocated in a plurality of frequency resource interlaces, in accordance with various aspects of the present disclosure. A set of the resource blocks may be allocated for transmission in each of a number of transmission time intervals (TTIs) in a radio frame, a transmission burst, or a transmission opportunity. In a downlink TTI (e.g., a downlink subframe), a set of the resource blocks may be allocated for downlink transmission (i.e., transmissions from a base station to a number of UEs, such as physical downlink shared channel (PDSCH) transmissions or PDCCH transmissions). In an uplink TTI (e.g., an uplink subframe), a set of the resource blocks may be allocated for uplink transmissions (e.g., transmissions from a number of UEs to a base station, such PUSCH transmissions, PUCCH transmissions, PRACH transmissions, or SRS transmissions). In some examples, the base station and UEs that communicate using the set of resource blocks may include aspects of the base stations 105, 205, or 205-*a* or UEs 115, 215, 215-*a*, or 215-*b* described with reference to FIG. 1 or 2.

By way of example, FIG. 3 shows a system bandwidth (e.g., a bandwidth of a shared radio frequency spectrum band) divided into 96 same size resource blocks. In other examples, the system bandwidth may be divided into 100 or some other number of same size resource blocks. In some examples, each resource block may include a plurality of sub-carriers or tones (e.g., 12 tones). In some examples, the resource blocks may be allocated to UEs for uplink transmissions on an individual basis. In some examples, the resource blocks may be allocated to UEs for uplink transmissions in groups. For example, and as shown, the 96 resource blocks may be divided into six frequency resource interlaces, with each of the frequency resource interlaces including a set of 16 resource blocks. In some examples, each of the frequency resource interlaces may include a set of equally spaced resource blocks (e.g., every sixth resource block within the system bandwidth). FIG. 3 identifies two frequency resource interlaces (e.g., a first frequency resource interlace 305 and a second frequency resource interlace 310) of a set of six frequency resource interlaces.

Figure 4:
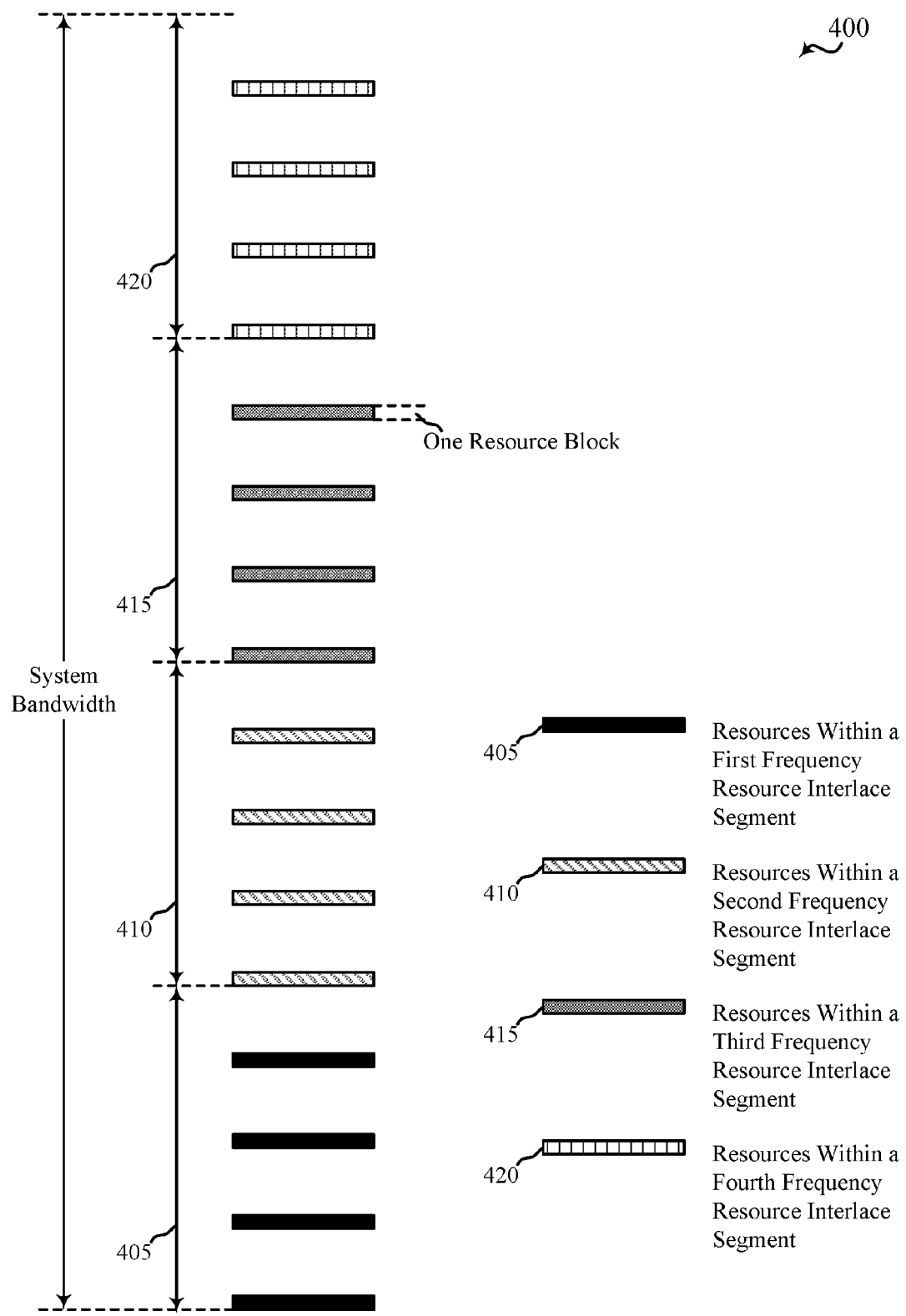
FIG. 4 shows a plurality of resource blocks of a single frequency resource interlace, which resource blocks may be allocated in frequency resource interlace segments, in accordance with various aspects of the present disclosure.

Allocating a set of resource blocks in a frequency resource interlace to a UE, for an uplink transmission, can assist in meeting a bandwidth occupancy requirement (e.g., an 80% bandwidth occupancy requirement) when not all of the resource blocks (or frequency resource interlaces) are allocated for uplink transmissions. In some examples, however, a bandwidth occupancy requirement may not exist or may be temporarily broken within small enough time intervals or under predetermined conditions. FIG. 4 therefore shows an alternative way to allocate the resource blocks of one or more frequency resource interlaces.

FIG. 4 shows a plurality of resource blocks of a single frequency resource interlace 400, which resource blocks may be allocated in frequency resource interlace segments, in accordance with various aspects of the present disclosure. In some examples, the frequency resource interlace 400 may be an example of the first frequency resource interlace 305 described with reference to FIG. 3.

As shown in FIG. 4, each resource block of the frequency resource interlace 400 may be included in one of a plurality of different frequency resource interlace segments. For example, each of the resource blocks may be allocated to one of a first frequency resource interlace segment 405, a second frequency resource interlace segment 410, a third frequency resource interlace segment 415, or a fourth frequency resource interlace segment 420. As shown, a group of four sequential resource blocks may be allocated to each of the first frequency resource interlace segment 405, the second frequency resource interlace segment 410, the third frequency resource interlace segment 415, and the fourth frequency resource interlace segment 420. In some examples, a group of four sequential resource blocks of each other frequency resource interlace within the system bandwidth may also be allocated to each of the first frequency resource interlace segment 405, the second frequency resource interlace segment 410, the third frequency resource interlace segment 415, and the fourth frequency resource interlace segment 420. Thus, each frequency resource interlace segment may include at least one resource (e.g., at least one resource block) in each of the frequency resource interlaces within the system bandwidth. In some examples, each of the frequency resource interlace segments (e.g., each of the first frequency resource interlace segment 405, the second frequency resource interlace segment 410, the third frequency resource interlace segment 415, and the fourth frequency resource interlace segment 420) may include a same number of resource blocks in each of the frequency resource interlaces (e.g., the first frequency resource interlace segment 405 may include four resource blocks in the first frequency resource interlace 400, four resource blocks in a second frequency resource interlace, etc.).

In some examples, each of the frequency resource interlace segments (e.g., each of the first frequency resource interlace segment 405, the second frequency resource interlace segment 410, the third frequency resource interlace segment 415, and the fourth frequency resource interlace segment 420) may have an equal number of resource blocks (e.g., four resource blocks of each frequency resource interlace, for a total of 24 resource blocks given six frequency resource interlaces). In other examples, a set of frequency resource interlace segments may include frequency resource interlace segments having at least two different numbers of resource blocks. For example, in a system bandwidth having 100 resource blocks, with a different set of 10 resource blocks allocated to each of 10 frequency resource interlaces, three frequency resource interlace segments may be defined, in which a first frequency resource interlace segment includes three resources blocks from each frequency resource interlace (for a total of 30 resource blocks), a second frequency resource interlace segment includes a different three resource blocks from each frequency resource interlace (for a total of 30 resource blocks), and a third frequency resource interlace segment includes the last four resource blocks of each frequency resource interlace (for a total of 40 resource blocks).

Figure 5:
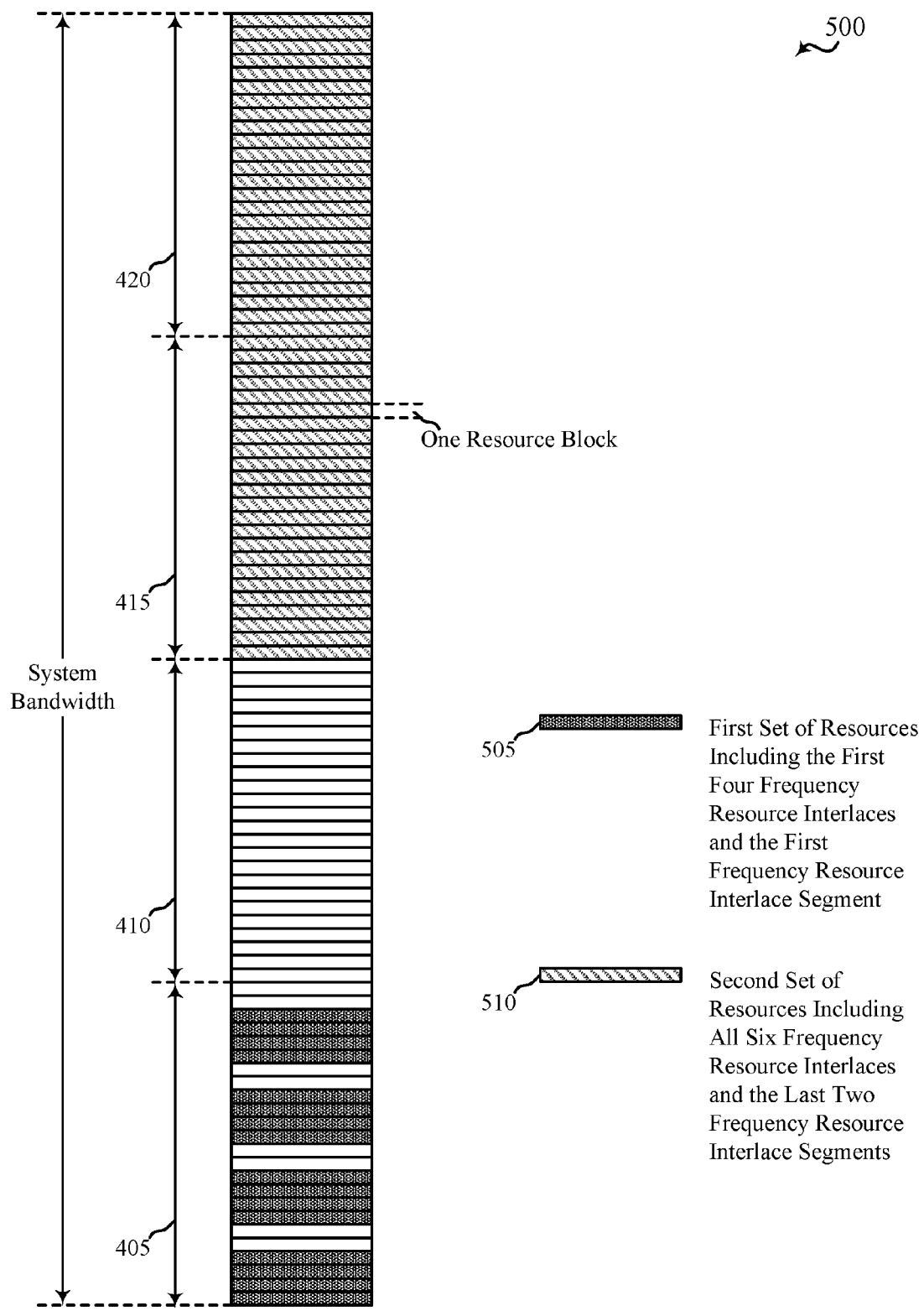
FIG. 5 shows a plurality of resource blocks of a system bandwidth, which resource blocks may be allocated in combinations of sets of frequency resource interlaces and sets of frequency resource interlace segments to one or more UEs, in accordance with various aspects of the present disclosure.

FIG. 5 shows a plurality of resource blocks 500 of a system bandwidth, which resource blocks may be allocated in combinations of sets of frequency resource interlaces and sets of frequency resource interlace segments to one or more UEs, in accordance with various aspects of the present disclosure. In some examples, the plurality of resource blocks 500 may be an example of the plurality of resource blocks 300 described with reference to FIG. 3.

In some examples, resource blocks within the plurality of resource blocks 500 may be allocated to one or more UEs (e.g., for uplink transmissions of the UEs) based on a plurality of frequency resource interlaces (e.g., the six frequency resource interlaces described with reference to FIG. 3) and a plurality of frequency resource interlace segments (e.g., the four frequency resource interlace segments described with reference to FIG. 4). An example allocation of resource blocks, to a first UE and a second UE, is shown in FIG. 5.

As shown in FIG. 5, the first UE may be allocated a first set of resources 505 (e.g., a first set of resource blocks) based on a first set of frequency resource interlaces and a first set of frequency resource interlace segments. The first set of frequency resource interlaces may include the first four frequency resource interlace described with reference to FIG. 3 (including the first frequency resource interlace 305 and the second frequency resource interlace 310), and the first set of frequency resource interlace segments may include the first frequency resource interlace described with reference to FIG. 4 segment (e.g., the first frequency resource interlace segment 405). Each allocated frequency resource interlace segment of the first set of frequency resource interlace segments includes a portion of resources of the frequency resource interlaces of the first set of frequency resource interlaces. As shown, the first set of resources 505 includes an interlaced set of resources within the first frequency resource interlace segment 405.

The second UE may be allocated a second set of resources 510 (e.g., a second set of resource blocks) based on a second set of frequency resource interlaces and a second set of frequency resource interlace segments. The second set of frequency resource interlaces may include all six of the frequency resource interlaces described with reference to FIG. 3, and the second set of frequency resource interlace segments may include the last two frequency resource interlace segments described with reference to FIG. 4 (e.g., the third frequency resource interlace segment 415 and the fourth frequency resource interlace segment 420). Each allocated frequency resource interlace segment of the second set of frequency resource interlace segments includes a portion of resources of the frequency resource interlaces of the second set of frequency resource interlaces. As shown, the second set of resources 510 includes a contiguous set of resources within the third frequency resource interlace segment 415 and the fourth frequency resource interlace segment 420.

The allocations of the first set of resources 505 and the second set of resources 510 are exemplary, and other resource allocations, including resource allocations of more or fewer resources, to more or fewer UEs, are possible. In some examples, each of the first set of resources 505, the second set of resources 510, and other sets of resources may be identified in a field of an uplink grant associated with the allocated set of resources. In some examples, the field may include one bit per frequency resource interlace and one bit per frequency resource interlace segment. Thus, in a field in which a first six bits correspond to a first frequency resource interlace through a sixth frequency resource interlace, and a last four bits correspond to a first frequency resource interlace segment through a fourth frequency resource interlace segment, the first set of resources 505 may be identified by the bits 1111001000, and the second set of resources 510 may be identified by the bits 1111110011.

The allocation of resources (e.g., resource blocks) based on frequency resource interlace segments enables a higher granularity of resource allocation than resource allocation based on frequency resource interlaces alone, at the expense of a few extra bits of signaling in downlink control information (DCI).

Figure 6:
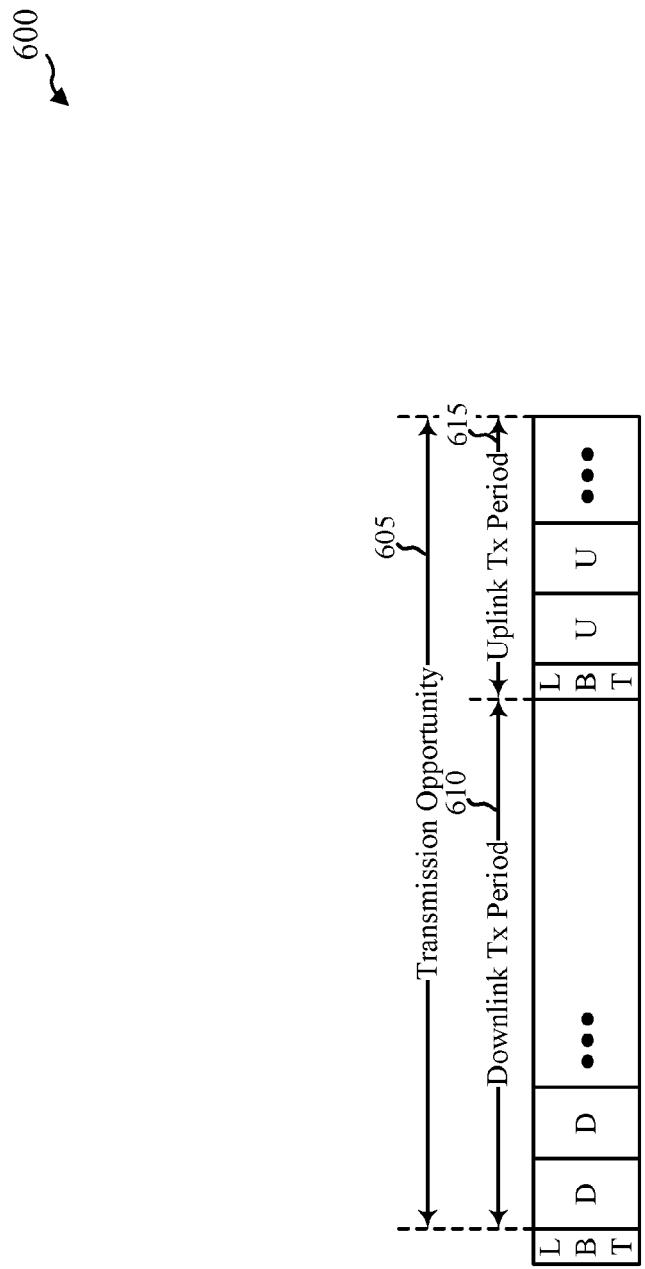
FIG. 6 shows a timeline of communications in an uplink, in accordance with various aspects of the present disclosure.

FIG. 6 shows a timeline 600 of communications in an uplink, in accordance with various aspects of the present disclosure. The timeline 600 shows a transmission opportunity 605 including a downlink transmission (Tx) period 610 followed by an uplink transmission (Tx) period 615. In some examples, the downlink transmission period 610 may be subdivided into a plurality of downlink TTIs (e.g., downlink (D) subframes), and the uplink transmission period 615 may be subdivided into a plurality of uplink TTIs (e.g., uplink (U) subframes).

In some examples, one or more of the downlink TTIs in the downlink transmission period 610 may carry uplink grants for one or more uplink TTIs in the uplink transmission period 615 (e.g., for same-carrier scheduling, or self-scheduling of uplink transmissions). In other examples, one or more uplink grants for one or more uplink TTIs in the uplink transmission period 615 may be transmitted on a different CC than the CC shown in FIG. 6 (e.g., for cross-carrier scheduling or semi-persistent scheduling (SPS)).

When multiple TTIs are scheduled for the uplink transmission period 615, DCI (e.g., a DCI Format 0) for the multiple TTIs may include parameters such as: resource block (RB) allocation, modulation and coding scheme (MCS) and redundancy value (RV), new data indicator (NDI), transmit power control (TPC) command, cell-specific demodulation reference signal (CS-DMRS), uplink (UL) index, downlink assignment index (DAI), channel state information (CSI) request, sounding reference signal (SRS)

request, resource allocation type, or a combination thereof. In LTE/LTE-A networks, TDD Format 0 allows two separate uplink grants to be carried to a single UE in a downlink TTI in a dedicated radio frequency spectrum band. The application of each uplink grant may be determined by an UL index associated with the uplink grant, and may influence power control, aperiodic CSI reporting, and PUSCH transmission. Similar functionality may be provided for an uplink grant applicable to an uplink transmission in a shared radio frequency spectrum band.

Assuming no cross-transmission opportunity scheduling or cross-carrier scheduling, multiple uplink grants for a multiple-TTI uplink transmission in a shared radio frequency spectrum band during the uplink transmission period 615 (which multiple uplink grants may be carried within a single downlink TTI of the downlink transmission period 610) may each include DCI fields such as: a UL index field, a HARQ index field, a reference signal and PUSCH multiplexing indicator field (e.g., a SRS/PUSCH multiplexing indicator field), a resource reuse indicator field (e.g., a PUCCH/PRACH resource reuse indicator field), LBT parameters, or a combination thereof. A UL index may indicate to a UE which uplink TTI (e.g., uplink subframe) in the transmission opportunity 605 (also referred to as a current transmission burst) carries a PUSCH transmission. The UL index may be referenced to an end of the downlink TTI carrying the uplink grant that includes the UL index. A SRS/PUSCH multiplexing indicator may indicate to a UE to: not transmit a SRS and begin a PUSCH transmission during a first symbol period following a successful performance of a LBT procedure; or transmit the SRS during the first symbol period and begin the PUSCH transmission during a second symbol period temporally following the first symbol period; or transmit a junk SRS during the first symbol period and begin the PUSCH transmission during the second symbol period. In some examples, the junk SRS may be transmitted on a frequency resource interlace allocated to all UEs for transmissions of junk SRSs. A PUCCH/PRACH resource indicator may indicate to a UE whether PUCCH resources, or PRACH resource, or a combination thereof are reallocated as PUSCH resources. LBT parameters may indicate to a UE whether to puncture a first symbol of an uplink TTI to perform a shortened LBT procedure (e.g., a 25 µs LBT procedure), or whether to perform a full-length LBT procedure (e.g., a category (CAT) 4 LBT procedure). When indicating to perform a CAT 4 LBT procedure, the LBT parameters may indicate one or more of a LBT priority class or a contention window size. In some examples, the loss of contention to access a shared radio frequency spectrum band during a TTI of a multi-TTI uplink transmission (e.g., by a UE performing a CAT 4 LBT procedure) may cause the UE to carryover the CAT 4 LBT procedure parameters to a next TTI of the multi-TTI uplink transmission.

Figure 7:
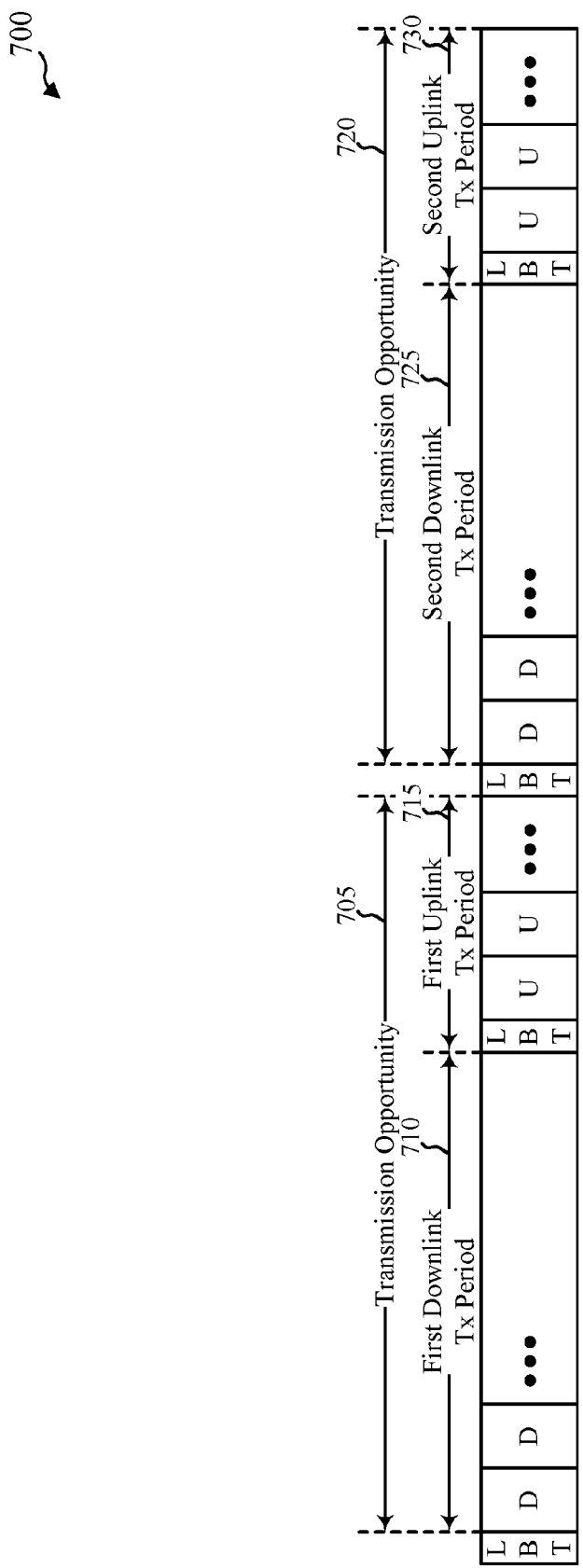
FIG. 7 shows a timeline of communications in an uplink, in accordance with various aspects of the present disclosure.

FIG. 7 shows a timeline 700 of communications in an uplink, in accordance with various aspects of the present disclosure. The timeline 700 shows a first transmission opportunity 705 followed by a second transmission opportunity 720. The first transmission opportunity 705 may include a first downlink transmission (Tx) period 710 followed by a first uplink transmission (Tx) period 715. The second transmission opportunity 720 may include a second downlink transmission (Tx) period 725 followed by a second uplink transmission (Tx) period 730. In some examples, one or both of the downlink transmission periods (e.g., the first downlink transmission period 710 or the second downlink transmission period 725) may be subdivided into a plurality of downlink TTIs (e.g., downlink (D) subframes), and one or both of the uplink transmission periods (e.g., the first uplink transmission period 715 or the second uplink transmission period 730) may be subdivided into a plurality of uplink TTIs (e.g., uplink (U) subframes).

In some examples, one or more of the downlink TTIs in the first downlink transmission period 710 may carry uplink grants for one or more uplink TTIs in the second uplink transmission period 730 (e.g., cross-transmission opportunity scheduling of uplink transmissions).

Assuming cross-transmission opportunity scheduling is used to schedule uplink transmissions in the second uplink transmission period 730, and assuming that the second downlink transmission period 725 precedes the second uplink transmission period 730, multiple uplink grants for a multiple-TTI uplink transmission in a shared radio frequency spectrum band during the second uplink transmission period 730 (which multiple uplink grants may be carried within a downlink TTI of the first downlink transmission period 710) may each include DCI fields such as: a UL index field, a HARQ index field, a reference signal and PUSCH multiplexing indicator field (e.g., a SRS/PUSCH multiplexing indicator field), a resource reuse indicator field (e.g., a PUCCH/PRACH resource reuse indicator field), LBT parameters, or a combination thereof. In addition, each uplink grant may include DCI fields such as: a current transmission burst index field, a target transmission burst index field, or a PUSCH transmission skipping strategy field. A current transmission burst index may indicate to a UE a first transmission burst (e.g., the first transmission opportunity 705) in which an uplink grant is received, and a target transmission burst index may indicate to the UE a second transmission burst (e.g., the second transmission opportunity 720) to which the uplink grant applies. In some examples, a base station may broadcast the current transmission burst index to a plurality of UEs, in DCI on a common PDCCH. A UL index may identify an uplink TTI of the second transmission burst (e.g., the second transmission opportunity 720) in which a PUSCH transmission begins. A PUSCH transmission skipping strategy may indicate, to a UE, whether to skip at least a temporally first PUSCH transmission, or at least a temporally last PUSCH transmission, when a LBT procedure for at least a first TTI of a multiple-TTI transmission is not successful.

In some examples, a UE that receives at least one uplink grant for at least one TTI of a multiple-TTI uplink transmission in a shared radio frequency spectrum band may perform a LBT procedure to contend for access to the shared radio frequency spectrum band for a TTI of the multiple-TTI uplink transmission. Upon losing contention for access to the shared radio frequency spectrum band for the TTI, the UE may trigger an uplink transmission carryover strategy. The uplink transmission carryover strategy may indicate to the UE to carryover or not carryover, to a next TTI of the multiple-TTI uplink transmission, a parameter associated with the TTI for which contention for access to the shared radio frequency spectrum band is lost. In some examples, the parameter may include a CSI transmission parameter, or a SRS transmission parameter, or a TPC command, or a combination thereof. In some examples, a carried over TPC command may be applied cumulatively to a TTI.

In some examples, a UE that receives at least one uplink grant for at least one TTI of a multiple-TTI uplink transmission in a shared radio frequency spectrum band may perform a LBT procedure to contend for access to the shared radio frequency spectrum band for a TTI of the multiple-TTI uplink transmission. Upon winning contention for access to the shared radio frequency spectrum band for the TTI, the UE may transmit data associated with a LBT priority class (e.g., best effort data, video data, etc.) indicated in an uplink grant for the TTI. Upon running out of data associated with the LBT priority class, the UE may or may not transmit junk data for the remainder of the TTI.

In some examples, a UE that receives at least one uplink grant for at least one TTI of a multiple-TTI uplink transmission in a shared radio frequency spectrum band may be triggered to transmit a SRS without a PUSCH transmission during a TTI, by disabling all of the transport blocks (TBs) within the TTI.

Figure 8:
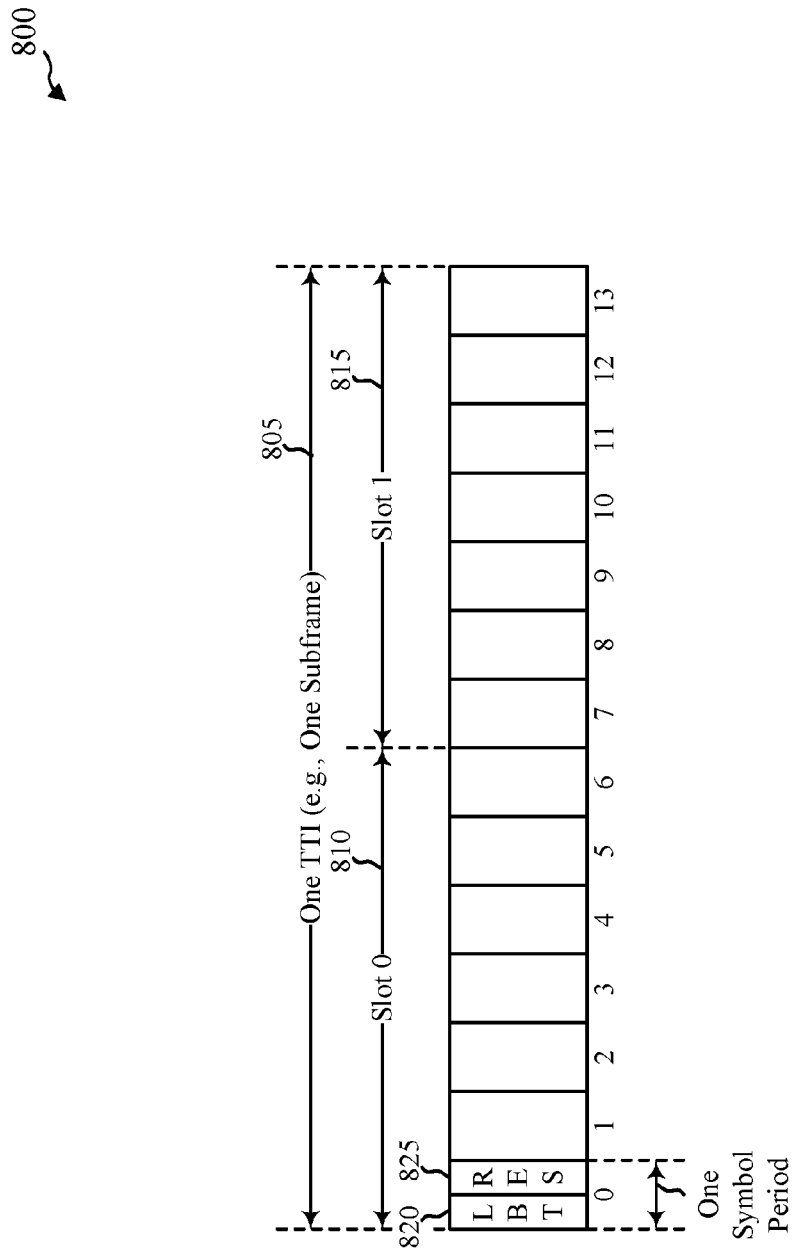
FIG. 8 shows a timeline of communications in an uplink of a shared radio frequency spectrum band, and the performance of a LBT procedure, followed by a transmission of a channel reservation signal, in accordance with various aspects of the present disclosure.

FIG. 8 shows a timeline 800 of communications in an uplink of a shared radio frequency spectrum band, and the performance of a LBT procedure 820, followed by a transmission of a channel reservation signal 825, in accordance with various aspects of the present disclosure. The timeline 800 shows one TTI 805 (e.g., one uplink (U) subframe) of an uplink transmission period (e.g., one TTI of the uplink transmission period 615 described with reference to FIG. 6 or the first uplink transmission period 715 or second uplink transmission period 730 described with reference to FIG. 7). The TTI 805 includes a plurality of symbol periods (e.g., 14 symbol periods numbered 0-13) spanning two slots (e.g., a Slot 0 810 and a Slot 1 815).

A UE may perform a LBT procedure 820 for the TTI 805. In some examples, the LBT procedure 820 may be performed during a temporally first symbol period (e.g., Symbol Period 0) of the TTI 805. In some examples (not shown), the LBT procedure 820 may be synced to an end of the first symbol period, and upon winning contention for access to the shared radio frequency spectrum band, the UE may immediately begin an uplink transmission (e.g., a PUSCH transmission, or a PUCCH transmission, or a PRACH transmission, or a SRS transmission, or a combination thereof) in a temporally second symbol period (e.g., Symbol Period 1) of the TTI 805. In other examples (shown), the LBT procedure 820 may be synced to a beginning of the first symbol period and performed during a first portion of the first symbol period), and upon winning contention for access to the shared radio frequency spectrum band, the UE may transmit a channel reservation signal (RES) 825 during a second portion of the first symbol period. The channel reservation signal may be transmitted to reserve the shared radio frequency spectrum band between a time contention for access to the shared radio frequency spectrum band is won and a time an uplink transmission is scheduled to begin.

In some examples, the UE may select one of a plurality of different channel reservation signals to transmit during the second portion of the first symbol period (e.g., as RES 825). When the UE is scheduled to transmit a SRS before a PUSCH during the TTI 805, the selected channel reservation signal may include a SRS waveform. When the UE is scheduled to transmit a PUSCH but not a SRS during the TTI 805, and when a junk SRS interface is active during the first symbol period of the TTI, the selected channel reservation signal may include a junk SRS waveform. When a network access device that transmits an uplink grant for the TTI 805 does not indicate a selection methodology for selecting the channel reservation signal, the selected channel reservation signal may include a Wi-Fi channel reservation signal (e.g., a CTS2S). Alternatively, when the network access device that transmits the uplink grant for the TTI 805 does not indicate a selection methodology for selecting the channel reservation signal, the UE may select any form a channel reservation signal.

Figure 9:
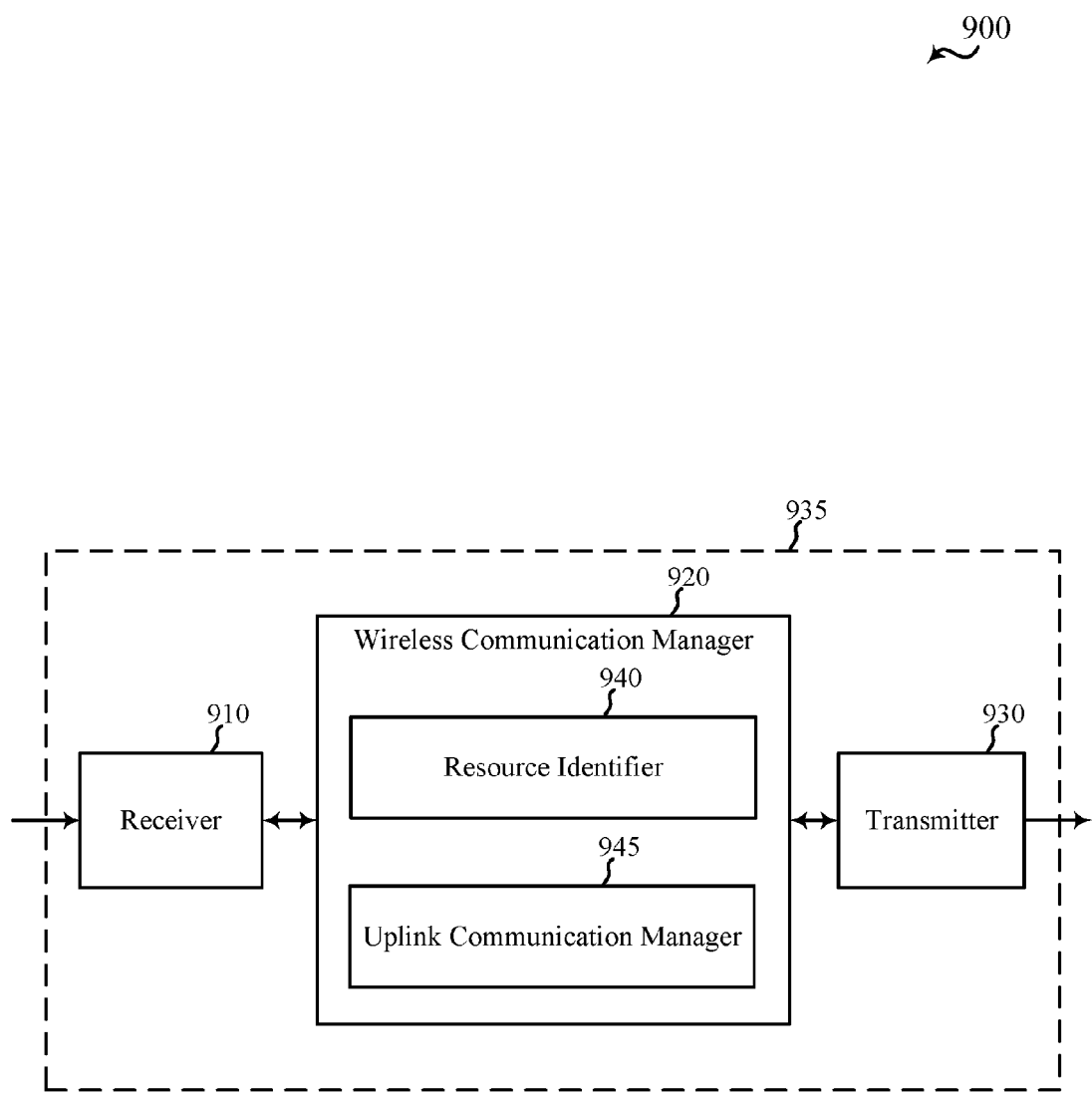
FIG. 9 shows a block diagram of an apparatus for use in wireless communication, in accordance with various aspects of the present disclosure.

FIG. 9 shows a block diagram 900 of an apparatus 935 for use in wireless communication, in accordance with various aspects of the present disclosure. The apparatus 935 may be an example of aspects of one or more of the UEs 115, 215, 215-a, or 215-b or base stations 105, 205, or 205-a described with reference to FIG. 1 or 2. The apparatus 935 may also be or include a processor. The apparatus 935 may include a receiver 910, a wireless communication manager 920, or a transmitter 930. Each of these components may be in communication with each other.

The components of the apparatus 935 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one radio frequency (RF) receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, 5, 6, 7, or 8. The receiver 910 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 930 may include at least one RF transmitter, such as at least one RF transmitter operable to transmit over the dedicated radio frequency spectrum band or the shared radio frequency spectrum band. The transmitter 930 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 920 may be used to manage one or more aspects of wireless communication for the apparatus 935. In some examples, part of the wireless communication manager 920 may be incorporated into or shared with the receiver 910 or the transmitter 930. In some examples, the wireless communication manager 920 may include a resource identifier 940 or an uplink communication manager 945.

The resource identifier 940 may be used to identify a first set of resources for a first uplink transmission. The first set of resources may be based on a first set of frequency resource interlaces and a first set of frequency resource interlace segments. Each frequency resource interlace segment of the first set of frequency resource interlace segments may include a portion of resources of the frequency resource interlaces of the first set of frequency resource interlaces. In some examples, the first uplink transmission may include: a PUSCH transmission, or a PUCCH transmission, or a PRACH transmission, or a SRS transmission, or a combination thereof. In some examples, the first set of resources may be in a shared radio frequency spectrum band.

In some examples of the apparatus 935, the first set of resources may include a first set of resource blocks. In some examples, each frequency resource interlace segment may include at least one resource in each of the frequency resource interlaces (e.g., as shown in FIG. 3, 4, or 5). In some examples, each of the frequency resource interlace segments may include a same number of resource blocks in each of the frequency resource interlaces (e.g., as shown in FIG. 4 or 5). In some examples, the frequency resource interlace segments may include one of: frequency resource interlace segments having equal numbers of resources blocks (as shown in FIG. 4), or frequency resource interlace segments having at least two different numbers of resource blocks. In some examples, the first set of frequency resource interlaces may include all frequency resource interlaces, and the first set of frequency resource interlace segments may include a subset of frequency resource interlace segments (e.g., as shown in FIG. 5 by the second set of resources including a last two frequency resource interlace segments of all six frequency resource interlaces).

The uplink communication manager 945 may be used to communicate on an uplink using the first set of resources.

Figure 10:
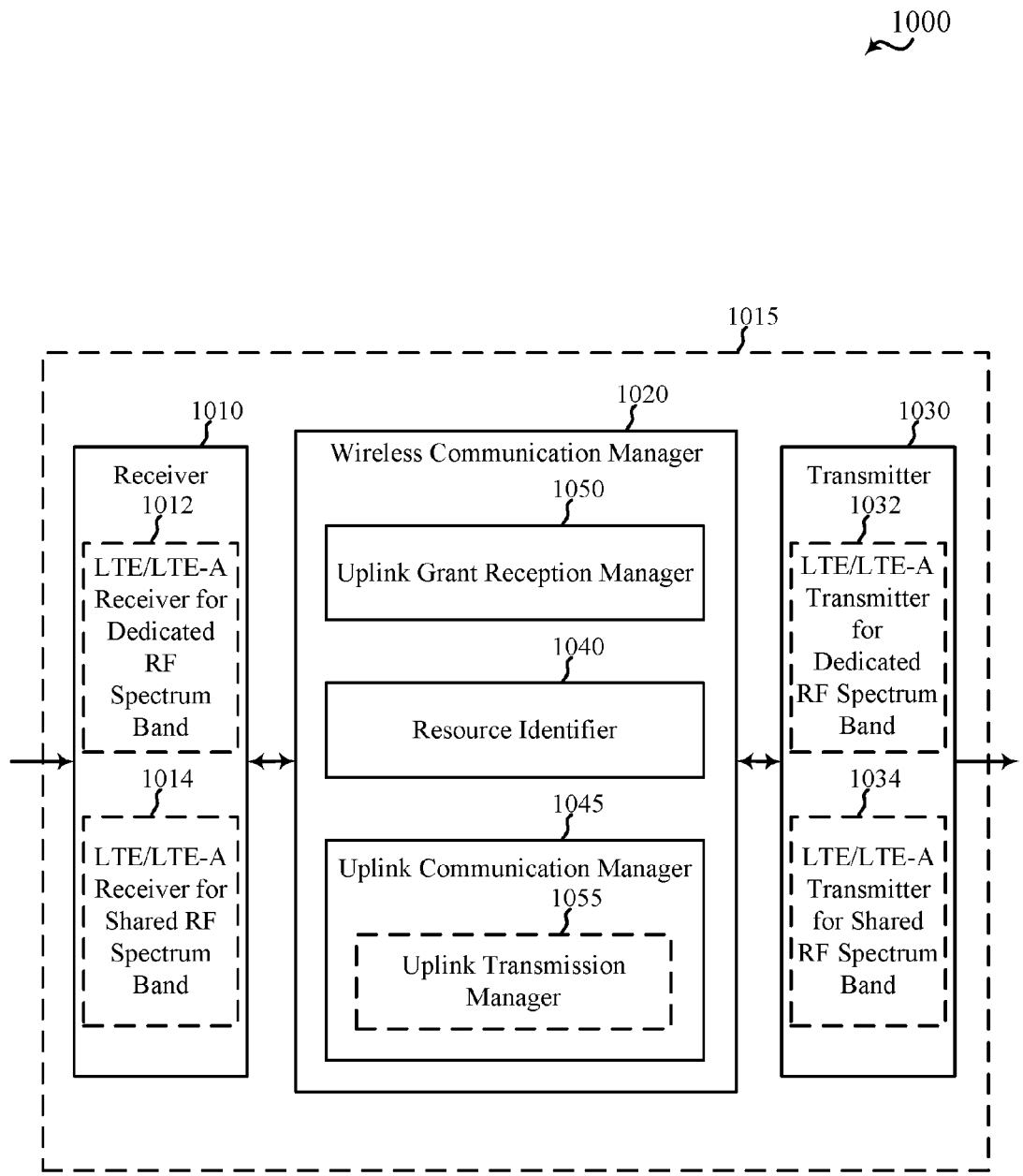
FIG. 10 shows a block diagram of an apparatus for use in wireless communication, in accordance with various aspects of the present disclosure.

FIG. 10 shows a block diagram 1000 of an apparatus 1015 for use in wireless communication, in accordance with various aspects of the present disclosure. The apparatus 1015 may be an example of aspects of one or more of the UEs 115, 215, 215-a, or 215-b described with reference to FIG. 1 or 2, or aspects of the apparatus 935 described with reference to FIG. 9. The apparatus 1015 may also be or include a processor. The apparatus 1015 may include a receiver 1010, a wireless communication manager 1020, or a transmitter 1030. Each of these components may be in communication with each other.

The components of the apparatus 1015 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1010 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, 5, 6, 7, or 8. The receiver 1010 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1012), and an LTE/LTE-A receiver for communicating over the shared radio frequency spectrum band (e.g., LTE/LTE-A receiver for shared RF spectrum band 1014). The receiver 1010, including the LTE/LTE-A receiver for dedicated RF spectrum band 1012 or the LTE/LTE-A receiver for shared RF spectrum band 1014, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1030 may include at least one RF transmitter, such as at least one RF transmitter operable to transmit over the dedicated radio frequency spectrum band or the shared radio frequency spectrum band. The transmitter 1030 may in some cases include separate transmitters for the dedicated radio frequency spectrum band or the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1032), and an LTE/LTE-A transmitter for communicating over the shared RF spectrum band (e.g., LTE/LTE-A transmitter for shared RF spectrum band 1034). The transmitter 1030, including the LTE/LTE-A transmitter for dedicated RF spectrum band 1032 or the LTE/LTE-A transmitter for shared RF spectrum band 1034, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated RF spectrum band or the shared RF spectrum band.

In some examples, the wireless communication manager 1020 may be used to manage one or more aspects of wireless communication for the apparatus 1015. In some examples, part of the wireless communication manager 1020 may be incorporated into or shared with the receiver 1010 or the transmitter 1030. In some examples, the wireless communication manager 1020 may include an uplink grant reception manager 1050, a resource identifier 1040, or an uplink communication manager 1045.

The uplink grant reception manager 1050 may be used to receive a first uplink grant for a first uplink transmission. In some examples, the first uplink transmission may include: a PUSCH transmission, or a PUCCH transmission, or a PRACH transmission, or a SRS transmission, or a combination thereof.

The resource identifier 1040 may be used to identify a first set of resources for the first uplink transmission. In some examples, the first set of resources for the first uplink transmission may be identified in the first uplink grant received by the uplink grant reception manager 1050. In some examples, the first set of resources for the first uplink transmission may be identified in a field of the first uplink grant. The field may include one bit per frequency resource interlace and one bit per frequency resource interlace segment. The first set of resources may be based on a first set of frequency resource interlaces and a first set of frequency resource interlace segments. Each frequency resource interlace segment of the first set of frequency resource interlace segments may include a portion of resources of the frequency resource interlaces of the first set of frequency resource interlaces. In some examples, the first set of resources may be in a shared radio frequency spectrum band.

In some examples of the apparatus 1015, the first set of resources may include a first set of resource blocks. In some examples, each frequency resource interlace segment may include at least one resource in each of the frequency resource interlaces (e.g., as shown in FIG. 3, 4, or 5). In some examples, each of the frequency resource interlace segments may include a same number of resource blocks in each of the frequency resource interlaces (e.g., as shown in FIG. 4 or 5). In some examples, the frequency resource interlace segments may include one of: frequency resource interlace segments having equal numbers of resources blocks (as shown in FIG. 4), or frequency resource interlace segments having at least two different numbers of resource blocks. In some examples, the first set of frequency resource interlaces may include all frequency resource interlaces, and the first set of frequency resource interlace segments may include a subset of frequency resource interlace segments (e.g., as shown in FIG. 5 by the second set of resources including a last two frequency resource interlace segments of all six frequency resource interlaces).

The uplink communication manager 1045 may include an uplink transmission manager 1055. The uplink transmission manager 1055 may be used to communicate on an uplink using the first set of resources (e.g., transmit the first uplink transmission on the first set of resources of the uplink).

Figure 11:
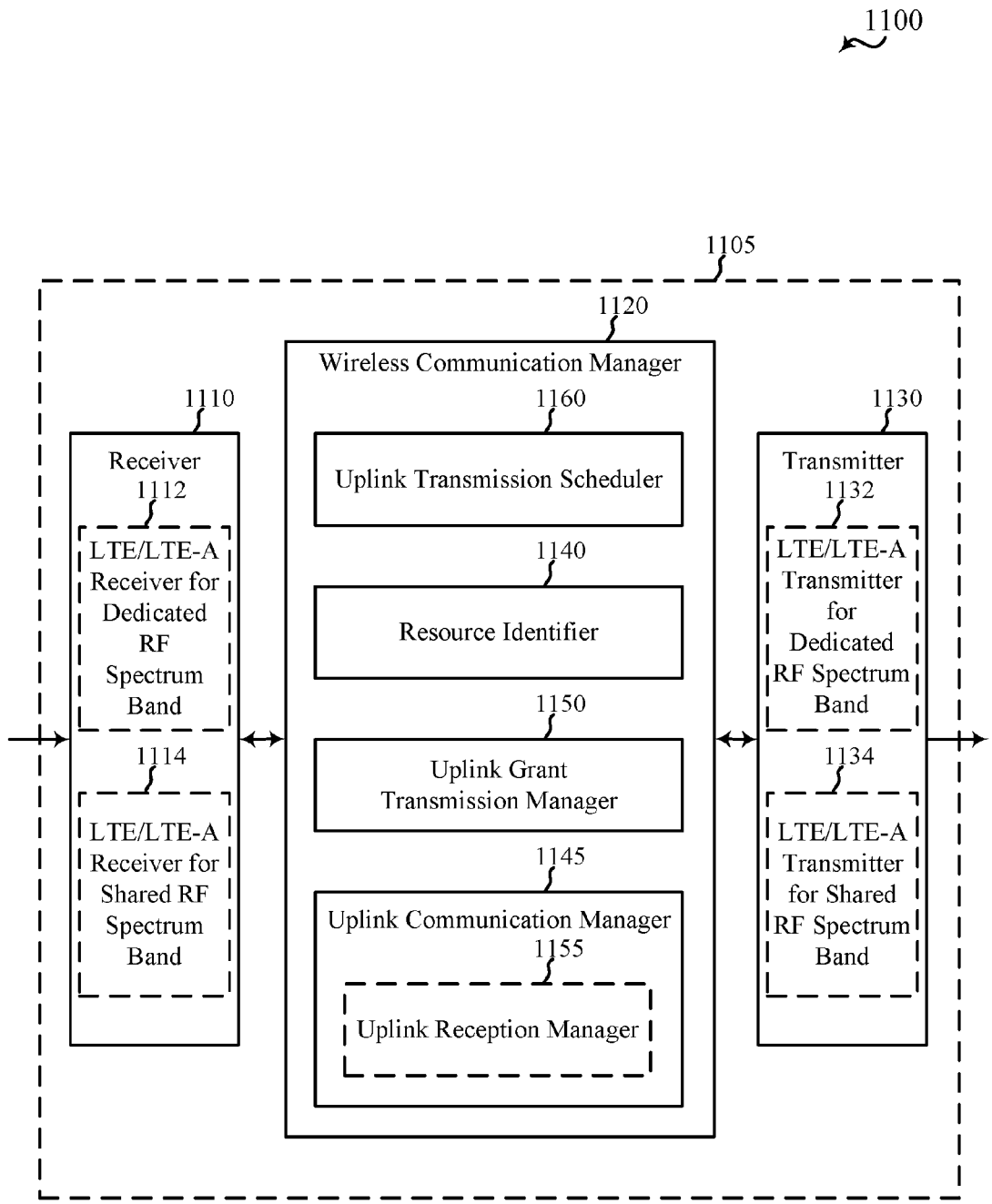
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. The apparatus 1105 may be an example of aspects of one or more of the base stations 105, 205, or 205-*a* described with reference to FIG. 1 or 2, or aspects of the apparatus 935 described with reference to FIG. 9. The apparatus 1105 may also be or include a processor. The apparatus 1105 may include a receiver 1110, a wireless communication manager 1120, or a transmitter 1130. Each of these components may be in communication with each other.

The components of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1110 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, 5, 6, 7, or 8. The receiver 1110 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1112), and an LTE/LTE-A receiver for communicating over the shared radio frequency spectrum band (e.g., LTE/LTE-A receiver for shared RF spectrum band 1114). The receiver 1110, including the LTE/LTE-A receiver for dedicated RF spectrum band 1112 or the LTE/LTE-A receiver for shared RF spectrum band 1114, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1130 may include at least one RF transmitter, such as at least one RF transmitter operable to transmit over the dedicated radio frequency spectrum band or the shared radio frequency spectrum band. The transmitter 1130 may in some cases include separate transmitters for the dedicated radio frequency spectrum band or the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1132), and an LTE/LTE-A transmitter for communicating over the shared RF spectrum band (e.g., LTE/LTE-A transmitter for shared RF spectrum band 1134). The transmitter 1130, including the LTE/LTE-A transmitter for dedicated RF spectrum band 1132 or the LTE/LTE-A transmitter for shared RF spectrum band 1134, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated RF spectrum band or the shared RF spectrum band.

In some examples, the wireless communication manager 1120 may be used to manage one or more aspects of wireless communication for the apparatus 1105. In some examples, part of the wireless communication manager 1120 may be incorporated into or shared with the receiver 1110 or the transmitter 1130. In some examples, the wireless communication manager 1120 may include an uplink transmission scheduler 1160, a resource identifier 1140, an uplink grant transmission manager 1150, or an uplink communication manager 1145.

The uplink transmission scheduler 1160 may be used to schedule one or more uplink transmissions for one or more UEs. In some examples, the scheduling may include scheduling a first uplink transmission of a first UE and/or a second uplink transmission of a second UE. The second uplink transmission may be scheduled for a same TTI as the first uplink transmission. In some examples, each of the first uplink transmission and/or the second uplink transmission may include: a PUSCH transmission, or a PUCCH transmission, or a PRACH transmission, or a SRS transmission, or a combination thereof.

The resource identifier 1140 may be used to identify a set of resources for each of the one or more uplink transmissions scheduled by the uplink transmission scheduler 1160. In some examples, the resource identification may include identifying a first set of resources for the first uplink transmission and/or a second set of resources for the second uplink transmission. In some examples, the first set of resources for the first uplink transmission may be identified in (e.g., selected and incorporated into) a first uplink grant for the first uplink transmission, and/or the second set of resources for the second uplink transmission may be identified in (e.g., selected and incorporated into) a second uplink grant for the second uplink transmission. In some examples, the first set of resources for the first uplink transmission may be identified in a field of the first uplink grant and/or the second set of resources for the second uplink transmission may be identified in a field of the second uplink grant. Each of the fields may include one bit per frequency resource interlace and one bit per frequency resource interlace segment. The first set of resources may be based on a first set of frequency resource interlaces and a first set of frequency resource interlace segments. Each frequency resource interlace segment of the first set of frequency resource interlace segments may include a portion of resources of the frequency resource interlaces of the first set of frequency resource interlaces. The second set of resources may be based on a second set of frequency resource interlaces and a second set of frequency resource interlace segments. Each frequency resource interlace segment of the second set of frequency resource interlace segments may include a portion of resources of the frequency resource interlaces of the second set of frequency resource interlaces. In some examples, the first set of resources and/or the second set of resources may be in a shared radio frequency spectrum band.

In some examples of the apparatus 1105, the first set of resources may include a first set of resource blocks and/or the second set of resources may include a second set of resource blocks. In some examples, each frequency resource interlace segment may include at least one resource in each of the frequency resource interlaces (e.g., as shown in FIG. 3, 4, or 5). In some examples, each of the frequency resource interlace segments may include a same number of resource blocks in each of the frequency resource interlaces (e.g., as shown in FIG. 4 or 5). In some examples, the frequency resource interlace segments may include one of: frequency resource interlace segments having equal numbers of resources blocks (as shown in FIG. 4), or frequency resource interlace segments having at least two different numbers of resource blocks.

In some examples, the first set of frequency resource interlaces may include all frequency resource interlaces, and the first set of frequency resource interlace segments may include a subset of frequency resource interlace segments (e.g., as shown in FIG. 5 by the second set of resources including the last two (of four) frequency resource interlace segments of all six frequency resource interlaces). In some examples, the second set of frequency resource interlaces may include a subset of the frequency resource interlaces (e.g., as shown in FIG. 5 by the first set of resources including the first (of four) frequency resource interlace segment of the first four (of six) frequency resource interlaces).

The uplink grant transmission manager 1150 may be used to transmit uplink grants to the UE(s). In some examples, the uplink grant transmission manager 1150 may transmit the first uplink grant for the first uplink transmission to the first UE and/or transmit the second uplink grant for the second uplink transmission to the second UE.

The uplink communication manager 1145 may include an uplink reception manager 1155. The uplink reception manager 1155 may be used to communicate on an uplink (e.g., receive the first uplink transmission and/or the second uplink transmission on the uplink) using the first set of resources and/or the second set of resources.

Figure 12:
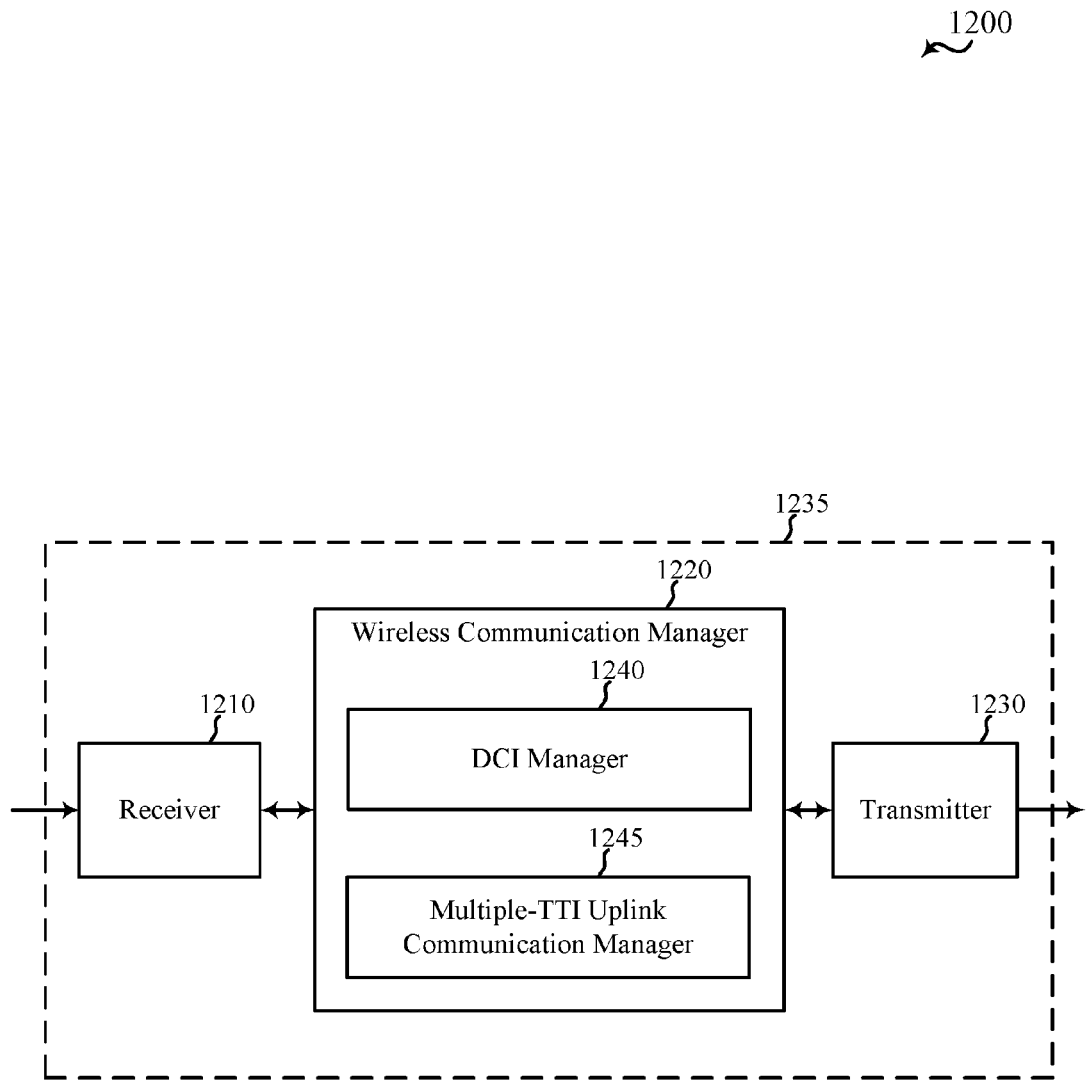
FIG. 12 shows a block diagram of an apparatus for use in wireless communication, in accordance with various aspects of the present disclosure.

FIG. 12 shows a block diagram 1200 of an apparatus 1235 for use in wireless communication, in accordance with various aspects of the present disclosure. The apparatus 1235 may be an example of aspects of one or more of the UEs 115, 215, 215-*a*, or 215-*b* or base stations 105, 205, or 205-*a* described with reference to FIG. 1 or 2. The apparatus 1235 may also be or include a processor. The apparatus 1235 may include a receiver 1210, a wireless communication manager 1220, or a transmitter 1230. Each of these components may be in communication with each other.

The components of the apparatus 1235 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1210 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, 5, 6, 7, or 8. The receiver 1210 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1230 may include at least one RF transmitter, such as at least one RF transmitter operable to transmit over the dedicated radio frequency spectrum band or the shared radio frequency spectrum band. The transmitter 1230 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 1220 may be used to manage one or more aspects of wireless communication for the apparatus 1235. In some examples, part of the wireless communication manager 1220 may be incorporated into or shared with the receiver 1210 or the transmitter 1230. In some examples, the wireless communication manager 1220 may include a DCI manager 1240 or a multiple-TTI uplink communication manager 1245.

The DCI manager 1240 may be used to identify, in an uplink grant for at least one TTI of a multiple-TTI uplink transmission of a UE, DCI including: a reference signal and PUSCH multiplexing indicator, or a resource reuse indicator, or a PUSCH transmission skipping strategy, or a combination thereof. In some examples, the multiple-TTI uplink transmission may include an uplink transmission in a shared radio frequency spectrum band.

The multiple-TTI uplink communication manager 1245 may be used to communicate on an uplink, during the multiple-TTI uplink transmission, in accordance with the DCI.

Figure 13:
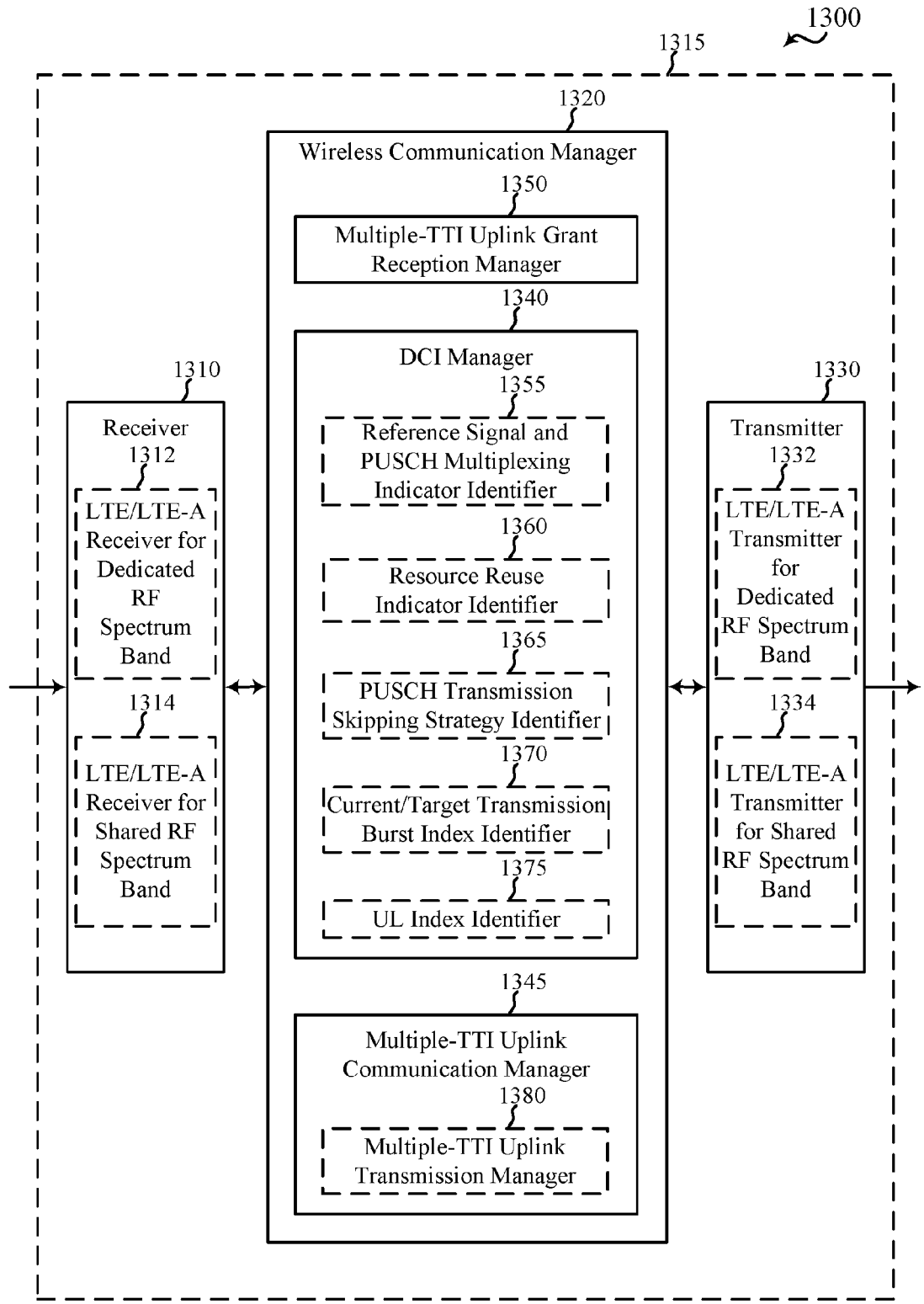
FIG. 13 shows a block diagram of an apparatus for use in wireless communication, in accordance with various aspects of the present disclosure.

FIG. 13 shows a block diagram 1300 of an apparatus 1315 for use in wireless communication, in accordance with various aspects of the present disclosure. The apparatus 1315 may be an example of aspects of one or more of the UEs 115, 215, 215-*a*, or 215-*b* described with reference to FIG. 1 or 2, or aspects of the apparatus 1235 described with reference to FIG. 12. The apparatus 1315 may also be or include a processor. The apparatus 1315 may include a receiver 1310, a wireless communication manager 1320, or a transmitter 1330. Each of these components may be in communication with each other.

The components of the apparatus 1315 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1310 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, 5, 6, 7, or 8. The receiver 1310 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1312), and an LTE/LTE-A receiver for communicating over the shared radio frequency spectrum band (e.g., LTE/LTE-A receiver for shared RF spectrum band 1314). The receiver 1310, including the LTE/LTE-A receiver for dedicated RF spectrum band 1312 or the LTE/LTE-A receiver for shared RF spectrum band 1314, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1330 may include at least one RF transmitter, such as at least one RF transmitter operable to transmit over the dedicated radio frequency spectrum band or the shared radio frequency spectrum band. The transmitter 1330 may in some cases include separate transmitters for the dedicated radio frequency spectrum band or the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1332), and an LTE/LTE-A transmitter for communicating over the shared RF spectrum band (e.g., LTE/LTE-A transmitter for shared RF spectrum band 1334). The transmitter 1330, including the LTE/LTE-A transmitter for dedicated RF spectrum band 1332 or the LTE/LTE-A transmitter for shared RF spectrum band 1334, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated RF spectrum band or the shared RF spectrum band.

In some examples, the wireless communication manager 1320 may be used to manage one or more aspects of wireless communication for the apparatus 1315. In some examples, part of the wireless communication manager 1320 may be incorporated into or shared with the receiver 1310 or the transmitter 1330. In some examples, the wireless communication manager 1320 may include a multiple-TTI uplink grant reception manager 1350, a DCI manager 1340, or a multiple-TTI uplink communication manager 1345.

The multiple-TTI uplink grant reception manager 1350 may be used to receive, at a UE including the apparatus 1315, an uplink grant for at least one TTI of a multiple-TTI uplink transmission of the UE. In some examples, the multiple-TTI uplink transmission may include an uplink transmission in a shared radio frequency spectrum band.

The DCI manager 1340 may be used to identify, in the uplink grant for the at least one TTI of the multiple-TTI uplink transmission of the UE, DCI including a number of parameters. In some examples, the DCI manager 1340 may include a reference signal and PUSCH multiplexing indicator identifier 1355, a resource reuse indicator identifier 1360, a PUSCH transmission skipping strategy identifier 1365, a current/target transmission burst index identifier 1370, or a UL index identifier 1375.

The reference signal and PUSCH multiplexing indicator identifier 1355 may be used to identify a reference signal and PUSCH multiplexing indicator. In some examples, the reference signal and PUSCH multiplexing indicator may indicate to the UE to: not transmit a SRS and begin a PUSCH transmission during a first symbol period following a successful performance of a LBT procedure; or transmit the SRS during the first symbol period and begin the PUSCH transmission during a second symbol period temporally following the first symbol period; or transmit a junk SRS during the first symbol period and begin the PUSCH transmission during the second symbol period.

The resource reuse indicator identifier 1360 may be used to identify a resource reuse indicator. In some examples, the resource reuse indicator may indicate to the UE whether at least one of PUCCH resources or PRACH resources are reallocated as PUSCH resources.

The PUSCH transmission skipping strategy identifier 1365 may be used to identify a PUSCH transmission skipping strategy. The PUSCH transmission skipping strategy may indicate to the UE whether to skip at least a temporally first PUSCH transmission or at least a temporally last PUSCH transmission when a LBT procedure for at least a first TTI is not successful.

The current/target transmission burst index identifier 1370 may be used to identify a current transmission burst index and a target transmission burst index. The current transmission burst index may identify a first transmission burst in which the uplink grant is transmitted. The target transmission burst index may identify a second transmission burst to which the uplink grant applies. In some examples, the DCI may, additionally or alternatively, include an uplink index identifying an uplink TTI in the second transmission burst in which a PUSCH transmission begins. The UL index identifier 1375 may be used to identify an uplink index. The uplink index may identify an uplink TTI in the second transmission burst in which a PUSCH transmission begins.

The multiple-TTI uplink communication manager 1345 may include a multiple-TTI uplink transmission manager 1380. The multiple-TTI uplink transmission manager 1380 may be used to communicate on an uplink (e.g., transmit the multiple-TTI uplink transmission on the uplink), during the multiple-TTI uplink transmission, in accordance with the DCI.

Figure 14:
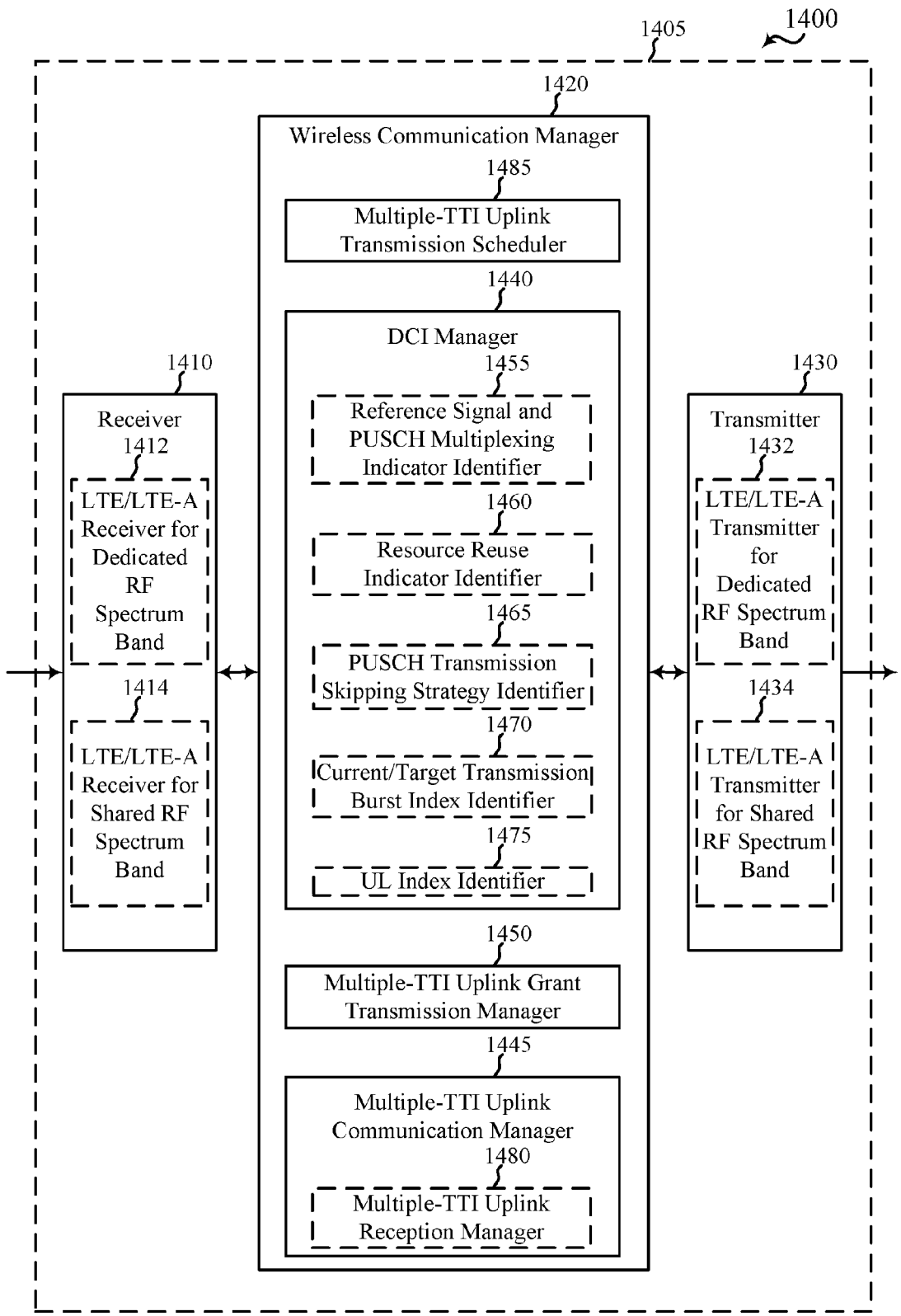
FIG. 14 shows a block diagram of an apparatus for use in wireless communication, in accordance with various aspects of the present disclosure.

FIG. 14 shows a block diagram 1400 of an apparatus 1405 for use in wireless communication, in accordance with various aspects of the present disclosure. The apparatus 1405 may be an example of aspects of one or more of the base stations 105, 205, or 205-*a* described with reference to FIG. 1 or 2, or aspects of the apparatus 1235 described with reference to FIG. 12. The apparatus 1405 may also be or include a processor. The apparatus 1405 may include a receiver 1410, a wireless communication manager 1420, or a transmitter 1430. Each of these components may be in communication with each other.

The components of the apparatus 1405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1410 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, 5, 6, 7, or 8. The receiver 1410 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1412), and an LTE/LTE-A receiver for communicating over the shared radio frequency spectrum band (e.g., LTE/LTE-A receiver for shared RF spectrum band 1414). The receiver 1410, including the LTE/LTE-A receiver for dedicated RF spectrum band 1412 or the LTE/LTE-A receiver for shared RF spectrum band 1414, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1430 may include at least one RF transmitter, such as at least one RF transmitter operable to transmit over the dedicated radio frequency spectrum band or the shared radio frequency spectrum band. The transmitter 1430 may in some cases include separate transmitters for the dedicated radio frequency spectrum band or the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1432), and an LTE/LTE-A transmitter for communicating over the shared RF spectrum band (e.g., LTE/LTE-A transmitter for shared RF spectrum band 1434). The transmitter 1430, including the LTE/LTE-A transmitter for dedicated RF spectrum band 1432 or the LTE/LTE-A transmitter for shared RF spectrum band 1434, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated RF spectrum band or the shared RF spectrum band.

In some examples, the wireless communication manager 1420 may be used to manage one or more aspects of wireless communication for the apparatus 1405. In some examples, part of the wireless communication manager 1420 may be incorporated into or shared with the receiver 1410 or the transmitter 1430. In some examples, the wireless communication manager 1420 may include a multiple-TTI uplink transmission scheduler 1485, a DCI manager 1440, a multiple-TTI uplink grant transmission manager 1450, or a multiple-TTI uplink communication manager 1445.

The multiple-TTI uplink transmission scheduler 1485 may be used to schedule a multiple-TTI uplink transmission of a UE. In some examples, the multiple-TTI uplink transmission may include an uplink transmission in a shared radio frequency spectrum band.

The DCI manager 1440 may be used to identify, in an uplink grant for at least one TTI of the multiple-TTI uplink transmission of the UE, DCI including a number of parameters. In some examples, identifying the DCI may include selecting the DCI and incorporating the DCI into the uplink grant or another transmission. In some examples, the DCI manager 1440 may include a reference signal and PUSCH multiplexing indicator identifier 1455, a resource reuse indicator identifier 1460, a PUSCH transmission skipping strategy identifier 1465, a current/target transmission burst index identifier 1470, or a UL index identifier 1475.

The reference signal and PUSCH multiplexing indicator identifier 1455 may be used to identify a reference signal and PUSCH multiplexing indicator. In some examples, the reference signal and PUSCH multiplexing indicator may indicate to the UE to: not transmit a SRS and begin a PUSCH transmission during a first symbol period following a successful performance of a LBT procedure; or transmit the SRS during the first symbol period and begin the PUSCH transmission during a second symbol period temporally following the first symbol period; or transmit a junk SRS during the first symbol period and begin the PUSCH transmission during the second symbol period.

The resource reuse indicator identifier 1460 may be used to identify a resource reuse indicator. In some examples, the resource reuse indicator may indicate to the UE whether at least one of PUCCH resources or PRACH resources are reallocated as PUSCH resources.

The PUSCH transmission skipping strategy identifier 1465 may be used to identify a PUSCH transmission skipping strategy. The PUSCH transmission skipping strategy may indicate to the UE whether to skip at least a temporally first PUSCH transmission or at least a temporally last PUSCH transmission when a LBT procedure for at least a first TTI is not successful.

The current/target transmission burst index identifier 1470 may be used to identify a current transmission burst index and a target transmission burst index. The current transmission burst index may identify a first transmission burst in which the uplink grant is transmitted. The target transmission burst index may identify a second transmission burst to which the uplink grant applies. In some examples, the DCI may, additionally or alternatively, include an uplink index identifying an uplink TTI in the second transmission burst in which a PUSCH transmission begins. The UL index identifier 1475 may be used to identify an uplink index. The uplink index may identify an uplink TTI in the second transmission burst in which a PUSCH transmission begins. In some examples, the DCI manager 1440 may broadcast the current transmission burst index to a plurality of UEs. In some examples, the current transmission burst index may be broadcast to the plurality of UEs in DCI on a common PDCCH receivable by the plurality of UEs.

The multiple-TTI uplink grant transmission manager 1450 may be used to transmit the uplink grant for the at least one TTI of the multiple-TTI uplink transmission to the UE.

The multiple-TTI uplink communication manager 1445 may include a multiple-TTI uplink reception manager 1480. The multiple-TTI uplink reception manager 1480 may be used to communicate on an uplink (e.g., receive the multiple-TTI uplink transmission on the uplink), during the multiple-TTI uplink transmission, in accordance with the DCI.

Figure 15:
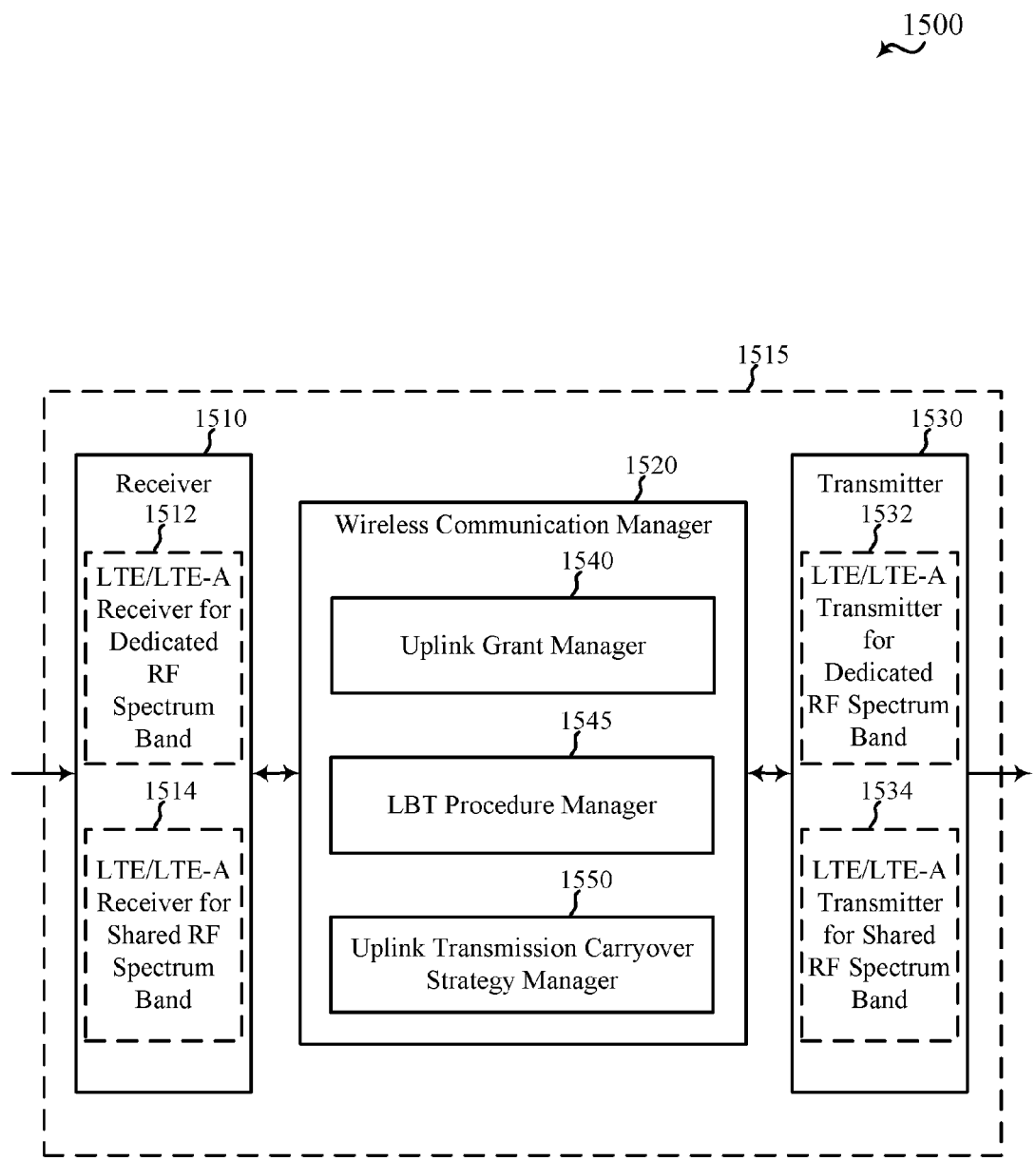
FIG. 15 shows a block diagram of an apparatus for use in wireless communication, in accordance with various aspects of the present disclosure.

FIG. 15 shows a block diagram 1500 of an apparatus 1515 for use in wireless communication, in accordance with various aspects of the present disclosure. The apparatus 1515 may be an example of aspects of one or more of the UEs 115, 215, 215-*a*, or 215-*b* described with reference to FIG. 1 or 2. The apparatus 1515 may also be or include a processor. The apparatus 1515 may include a receiver 1510, a wireless communication manager 1520, or a transmitter 1530. Each of these components may be in communication with each other.

The components of the apparatus 1515 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1510 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, 5, 6, 7, or 8. The receiver 1510 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1512), and an LTE/LTE-A receiver for communicating over the shared radio frequency spectrum band (e.g., LTE/LTE-A receiver for shared RF spectrum band 1514). The receiver 1510, including the LTE/LTE-A receiver for dedicated RF spectrum band 1512 or the LTE/LTE-A receiver for shared RF spectrum band 1514, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1530 may include at least one RF transmitter, such as at least one RF transmitter operable to transmit over the dedicated radio frequency spectrum band or the shared radio frequency spectrum band. The transmitter 1530 may in some cases include separate transmitters for the dedicated radio frequency spectrum band or the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1532), and an LTE/LTE-A transmitter for communicating over the shared RF spectrum band (e.g., LTE/LTE-A transmitter for shared RF spectrum band 1534). The transmitter 1530, including the LTE/LTE-A transmitter for dedicated RF spectrum band 1532 or the LTE/LTE-A transmitter for shared RF spectrum band 1534, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated RF spectrum band or the shared RF spectrum band.

In some examples, the wireless communication manager 1520 may be used to manage one or more aspects of wireless communication for the apparatus 1515. In some examples, part of the wireless communication manager 1520 may be incorporated into or shared with the receiver 1510 or the transmitter 1530. In some examples, the wireless communication manager 1520 may include an uplink grant manager 1540, a LBT procedure manager 1545, or an uplink transmission carryover strategy manager 1550.

The uplink grant manager 1540 may be used to receive at least one uplink grant for at least one TTI of a multiple-TTI uplink transmission in a shared radio frequency spectrum band. The LBT procedure manager 1545 may be used to perform a LBT procedure to contend for access to the shared radio frequency spectrum band for a TTI of the multiple-TTI uplink transmission. The uplink transmission carryover strategy manager 1550 may be used to trigger, upon losing contention for access to the shared radio frequency spectrum band for the TTI, an uplink transmission carryover strategy.

In some examples of the apparatus 1515, the uplink transmission carryover strategy may indicate to the UE to carryover or not carryover, to a next TTI of the multiple-TTI uplink transmission, a parameter associated with the TTI for which contention for access to the shared radio frequency spectrum band is lost. In some examples, the parameter may include at least one of: a CSI transmission parameter, or a SRS transmission parameter, or a TPC command, or a combination thereof.

Figure 16:
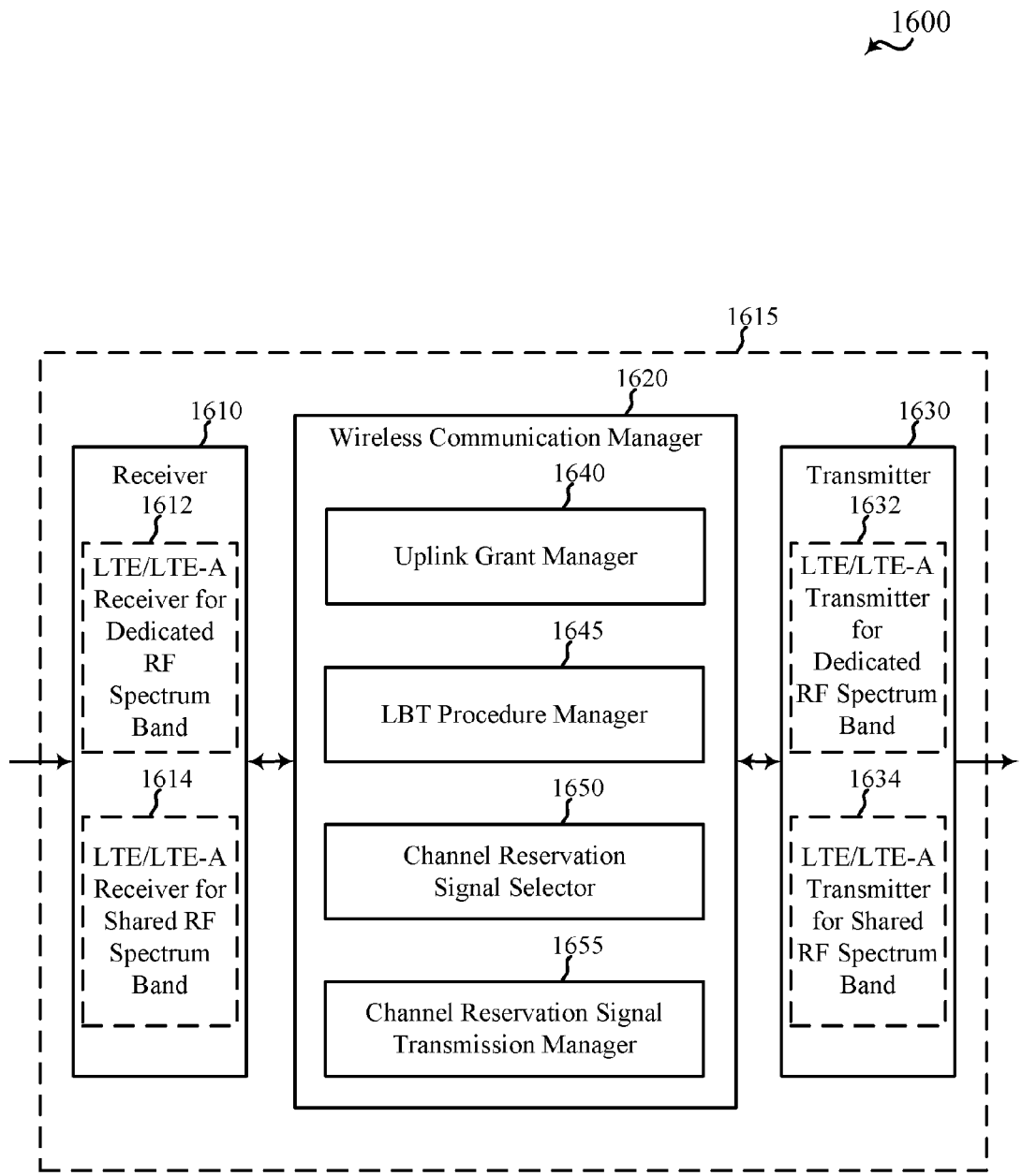
FIG. 16 shows a block diagram of an apparatus for use in wireless communication, in accordance with various aspects of the present disclosure.

FIG. 16 shows a block diagram 1600 of an apparatus 1615 for use in wireless communication, in accordance with various aspects of the present disclosure. The apparatus 1615 may be an example of aspects of one or more of the UEs 115, 215, 215-*a*, or 215-*b* described with reference to FIG. 1 or 2. The apparatus 1615 may also be or include a processor. The apparatus 1615 may include a receiver 1610, a wireless communication manager 1620, or a transmitter 1630. Each of these components may be in communication with each other.

The components of the apparatus 1615 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1610 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, 4, 5, 6, 7, or 8. The receiver 1610 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1612), and an LTE/LTE-A receiver for communicating over the shared radio frequency spectrum band (e.g., LTE/LTE-A receiver for shared RF spectrum band 1614). The receiver 1610, including the LTE/LTE-A receiver for dedicated RF spectrum band 1612 or the LTE/LTE-A receiver for shared RF spectrum band 1614, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1630 may include at least one RF transmitter, such as at least one RF transmitter operable to transmit over the dedicated radio frequency spectrum band or the shared radio frequency spectrum band. The transmitter 1630 may in some cases include separate transmitters for the dedicated radio frequency spectrum band or the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1632), and an LTE/LTE-A transmitter for communicating over the shared RF spectrum band (e.g., LTE/LTE-A transmitter for shared RF spectrum band 1634). The transmitter 1630, including the LTE/LTE-A transmitter for dedicated RF spectrum band 1632 or the LTE/LTE-A transmitter for shared RF spectrum band 1634, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated RF spectrum band or the shared RF spectrum band.

In some examples, the wireless communication manager 1620 may be used to manage one or more aspects of wireless communication for the apparatus 1615. In some examples, part of the wireless communication manager 1620 may be incorporated into or shared with the receiver 1610 or the transmitter 1630. In some examples, the wireless communication manager 1620 may include an uplink grant manager 1640, a LBT procedure manager 1645, a channel reservation signal selector 1650, or a channel reservation signal transmission manager 1655.

The uplink grant manager 1640 may be used to receive an uplink grant for an uplink transmission period in a shared radio frequency spectrum band.

The LBT procedure manager 1645 may be used to perform, during a first portion of a temporally first symbol period of the uplink transmission period, a LBT procedure to contend for access to the shared radio frequency spectrum band.

The channel reservation signal selector 1650 may be used to select, upon winning contention for access to the shared radio frequency spectrum band, a channel reservation signal to transmit during a second portion of the temporally first symbol period of the uplink transmission period. When a UE including the apparatus 1615 is scheduled to transmit a SRS before a PUSCH during the uplink transmission period, the selected channel reservation signal may include a SRS waveform. When the UE is scheduled to transmit a PUSCH but not a SRS during the uplink transmission period, and when a junk SRS interface is active during the temporally first symbol period of the uplink transmission period, the selected channel reservation signal may include a junk SRS waveform. When a network access device that transmits the uplink grant does not indicate a selection methodology for selecting the channel reservation signal, the selected channel reservation signal may include a Wi-Fi channel reservation signal (e.g., a CTS2S).

The channel reservation signal transmission manager 1655 may be used to transmit the selected channel reservation signal during the second portion of the temporally first symbol period of the uplink transmission period.

Figure 17:
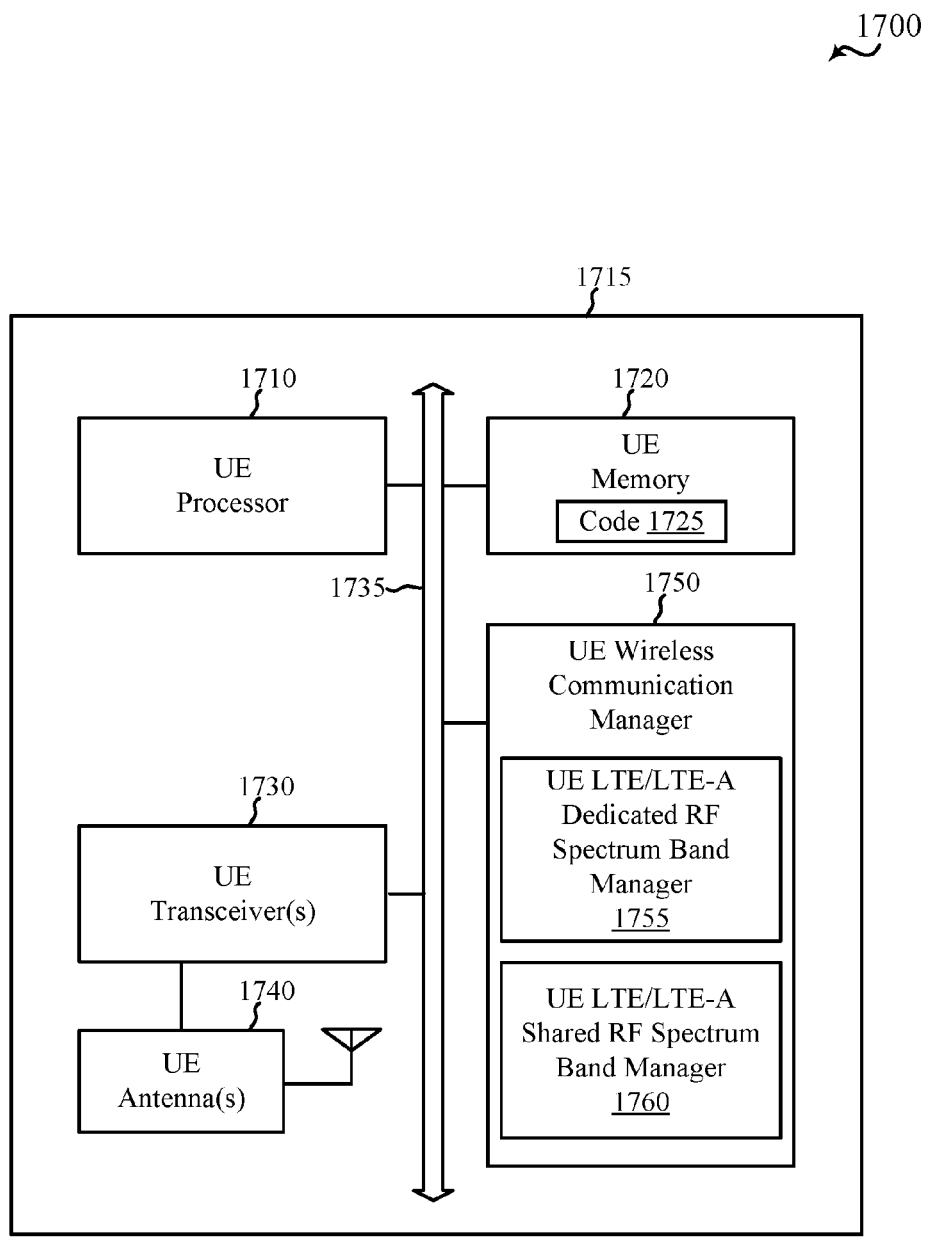
FIG. 17 shows a block diagram of a UE for use in wireless communication, in accordance with various aspects of the present disclosure.

FIG. 17 shows a block diagram 1700 of a UE 1715 for use in wireless communication, in accordance with various aspects of the present disclosure. The UE 1715 may be included or be part of a personal computer (e.g., a laptop computer, a netbook computer, a tablet computer, etc.), a cellular telephone, a PDA, a DVR, an internet appliance, a gaming console, an e-reader, etc. The UE 1715 may, in some examples, have an internal power supply (not shown), such as a small battery, to facilitate mobile operation. In some examples, the UE 1715 may be an example of aspects of one or more of the UEs 115, 215, 215-*a*, or 215-*b* described with reference to FIG. 1 or 2, or aspects of one or more of the apparatuses 935, 1015, 1235, 1315, 1515, or 1615 described with reference to FIG. 9, 10, 12, 13, 15, or 16. The UE 1715 may be configured to implement at least some of the UE or apparatus techniques and functions described with reference to FIG. 1, 2, 3, 4, 5, 6, 7, or 10.

The UE 1715 may include a UE processor 1710, a UE memory 1720, at least one UE transceiver (represented by UE transceiver(s) 1730), at least one UE antenna (represented by UE antenna(s) 1740), or a UE wireless communication manager 1750. Each of these components may be in communication with each other, directly or indirectly, over one or more buses 1735.

The UE memory 1720 may include random access memory (RAM) or read-only memory (ROM). The UE memory 1720 may store computer-readable, computer-executable code 1725 containing instructions that are configured to, when executed, cause the UE processor 1710 to perform various functions described herein related to wireless communication, including, for example, receiving one or more uplink grants and transmitting an uplink transmission in a shared radio frequency spectrum band. Alternatively, the computer-executable code 1725 may not be directly executable by the UE processor 1710 but be configured to cause the UE 1715 (e.g., when compiled and executed) to perform various of the functions described herein.

The UE processor 1710 may include an intelligent hardware device, e.g., a central processing unit (CPU), a microcontroller, an ASIC, etc. The UE processor 1710 may process information received through the UE transceiver(s) 1730 or information to be sent to the UE transceiver(s) 1730 for transmission through the UE antenna(s) 1740. The UE processor 1710 may handle, alone or in connection with the UE wireless communication manager 1750, various aspects of communicating over (or managing communications over) a dedicated radio frequency spectrum band or a shared radio frequency spectrum band. The dedicated radio frequency spectrum band may include a radio frequency spectrum band licensed to particular users for particular uses. The shared radio frequency spectrum band may include a radio frequency spectrum band available for Wi-Fi use, a radio frequency spectrum band available for use by different radio access technologies, or a radio frequency spectrum band available for use by multiple MNOs in an equally shared or prioritized manner.

The UE transceiver(s) 1730 may include a modem configured to modulate packets and provide the modulated packets to the UE antenna(s) 1740 for transmission, and to demodulate packets received from the UE antenna(s) 1740. The UE transceiver(s) 1730 may, in some examples, be implemented as one or more UE transmitters and one or more separate UE receivers. The UE transceiver(s) 1730 may support communications in the dedicated radio frequency spectrum band or the shared radio frequency spectrum band. The UE transceiver(s) 1730 may be configured to communicate bi-directionally, via the UE antenna(s) 1740, with one or more network access devices (e.g., base stations) or apparatuses, such as one or more of the base stations 105, 205, or 205-*a* described with reference to FIG. 1 or 2, or one or more of the apparatuses 935, 1105, 1235, or 1405 described with reference to FIG. 9, 11, 12, or 14. While the UE 1715 may include a single UE antenna, there may be examples in which the UE 1715 may include multiple UE antennas 1740.

The UE wireless communication manager 1750 may be configured to perform or control some or all of the UE or apparatus techniques or functions described with reference to FIG. 1, 2, 3, 4, 5, 6, 7, 8, 9, 10, 12, 13, 15, or 16 related to wireless communication over the licensed spectrum or the unlicensed spectrum. For example, the UE wireless communication manager 1750 may be configured to support a supplemental downlink mode (e.g., a first licensed assisted access mode), a carrier aggregation mode (e.g., a second licensed assisted access mode), or a standalone mode using the dedicated radio frequency spectrum band or the shared radio frequency spectrum band. The UE wireless communication manager 1750 may include a UE LTE/LTE-A dedicated RF spectrum band manager 1755 configured to handle LTE/LTE-A communications in the dedicated radio frequency spectrum band, and a UE LTE/LTE-A shared RF spectrum band manager 1760 configured to handle LTE/LTE-A communications in the shared radio frequency spectrum band. The UE wireless communication manager 1750, or portions of it, may include a processor, or some or all of the functions of the UE wireless communication manager 1750 may be performed by the UE processor 1710 or in connection with the UE processor 1710. In some examples, the UE wireless communication manager 1750 may be an example of the wireless communication manager 920, 1020, 1220, 1320, 1520, or 1620 described with reference to FIG. 9, 10, 12, 13, 15, or 16.

Figure 18:
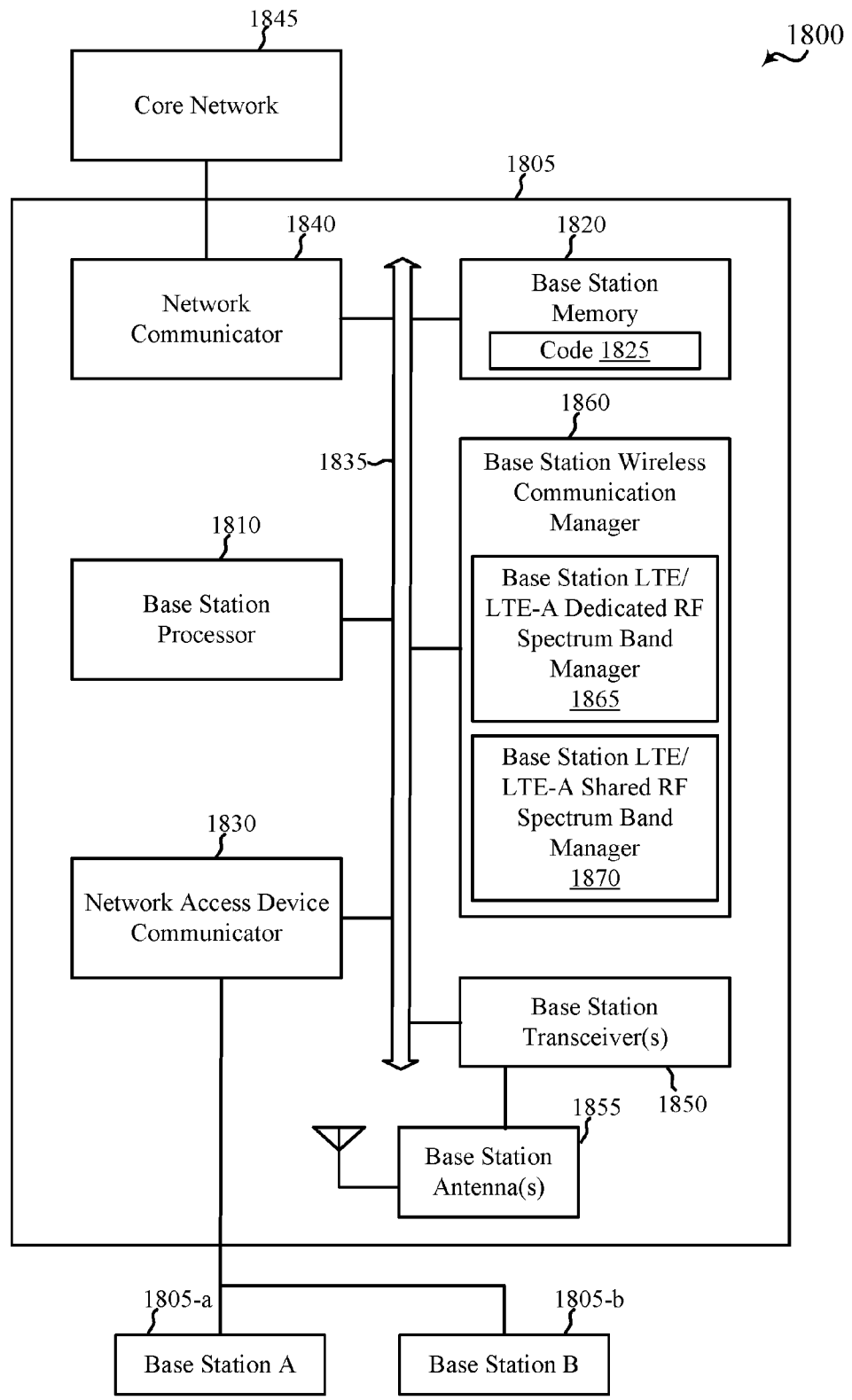
FIG. 18 shows a block diagram of a base station for use in wireless communication, in accordance with various aspects of the present disclosure.

FIG. 18 shows a block diagram 1800 of a base station 1805 for use in wireless communication, in accordance with various aspects of the present disclosure. In some examples, the base station 1805 may be an example of one or more aspects of the base stations 105, 205, or 205-*a* described with reference to FIG. 1 or 2, or aspects of one or more of the apparatuses 935, 1105, 1235, or 1405 described with reference to FIG. 9, 11, 12, or 14. The base station 1805 may be configured to implement or facilitate at least some of the base station or base station techniques and functions described with reference to FIG. 1, 2, 3, 4, 5, 6, 7, 8, 9, 11, 12, or 14.

The base station 1805 may include a base station processor 1810, a base station memory 1820, at least one base station transceiver (represented by base station transceiver (s) 1850), at least one base station antenna (represented by base station antenna(s) 1855), or a base station wireless communication manager 1860. The base station 1805 may also include one or more of a network access device communicator 1830 or a network communicator 1840. Each of these components may be in communication with each other, directly or indirectly, over one or more buses 1835.

The base station memory 1820 may include RAM or ROM. The base station memory 1820 may store computer-readable, computer-executable code 1825 containing instructions that are configured to, when executed, cause the base station processor 1810 to perform various functions described herein related to wireless communication, including, for example, scheduling uplink transmissions in an unlicensed spectrum, allocating resources for the uplink transmissions, transmitting uplink grants identifying the allocated resources, or receiving the uplink transmissions. Alternatively, the computer-executable code 1825 may not be directly executable by the base station processor 1810 but be configured to cause the base station 1805 (e.g., when compiled and executed) to perform various of the functions described herein.

The base station processor 1810 may include an intelligent hardware device, e.g., a CPU, a microcontroller, an ASIC, etc. The base station processor 1810 may process information received through the base station transceiver(s) 1850, the network access device communicator 1830, or the network communicator 1840. The base station processor 1810 may also process information to be sent to the transceiver(s) 1850 for transmission through the antenna(s) 1855, to the network access device communicator 1830, for transmission to one or more other network access devices (e.g., base station 1805-*a* and/or base station 1805-*b*), or to the network communicator 1840 for transmission to a core network 1845, which may be an example of one or more aspects of the core network 130 described with reference to FIG. 1. The base station processor 1810 may handle, alone or in connection with the base station wireless communication manager 1860, various aspects of communicating over (or managing communications over) a dedicated radio frequency spectrum band or a shared radio frequency spectrum band. The dedicated radio frequency spectrum band may include a radio frequency spectrum band licensed to particular users for particular uses. The shared radio frequency spectrum band may include a radio frequency spectrum band available for Wi-Fi use, a radio frequency spectrum band available for use by different radio access technologies, or a radio frequency spectrum band available for use by multiple MNOs in an equally shared or prioritized manner.

The base station transceiver(s) 1850 may include a modem configured to modulate packets and provide the modulated packets to the base station antenna(s) 1855 for transmission, and to demodulate packets received from the base station antenna(s) 1855. The base station transceiver(s) 1850 may, in some examples, be implemented as one or more base station transmitters and one or more separate base station receivers. The base station transceiver(s) 1850 may support communications in the dedicated radio frequency spectrum band or the shared radio frequency spectrum band. The base station transceiver(s) 1850 may be configured to communicate bi-directionally, via the base station antenna(s) 1855, with one or more UEs or apparatuses, such as one or more of the UEs 115, 215, 215-*a*, 215-*b*, or 1715 described with reference to FIG. 1, 2, or 17, or one or more of the apparatuses 935, 1015, 1235, 1315, 1515, or 1615 described with reference to FIG. 9, 10, 12, 13, 15, or 16. The base station 1805 may, for example, include multiple base station antennas 1855 (e.g., an antenna array). The base station 1805 may communicate with the core network 1845 through the network communicator 1840. The base station 1805 may also communicate with other network access devices, such as the base station 1805-*a* and/or the base station 1805-*b*, using the network access device communicator 1830.

The base station wireless communication manager 1860 may be configured to perform or control some or all of the techniques or functions described with reference to FIG. 1, 2, 3, 4, 5, 6, 7, 8, 9, 11, 12, or 14 related to wireless communication over the dedicated radio frequency spectrum band or the shared radio frequency spectrum band. For example, the base station wireless communication manager 1860 may be configured to support a supplemental downlink mode (e.g., a first licensed assisted access mode), a carrier aggregation mode (e.g., a second licensed assisted access mode), or a standalone mode using the dedicated radio frequency spectrum band or the shared radio frequency spectrum band. The base station wireless communication manager 1860 may include a base station LTE/LTE-A dedicated RF spectrum band manager 1865 configured to handle LTE/LTE-A communications in the dedicated radio frequency spectrum band, and a base station LTE/LTE-A shared RF spectrum band manager 1870 configured to handle LTE/LTE-A communications in the shared radio frequency spectrum band. The base station wireless communication manager 1860, or portions of it, may include a processor, or some or all of the functions of the base station wireless communication manager 1860 may be performed by the base station processor 1810 or in connection with the base station processor 1810. In some examples, the base station wireless communication manager 1860 may be an example of the wireless communication manager 920, 1120, 1220, or 1420 described with reference to FIG. 9, 11, 12, or 14.

Figure 19:
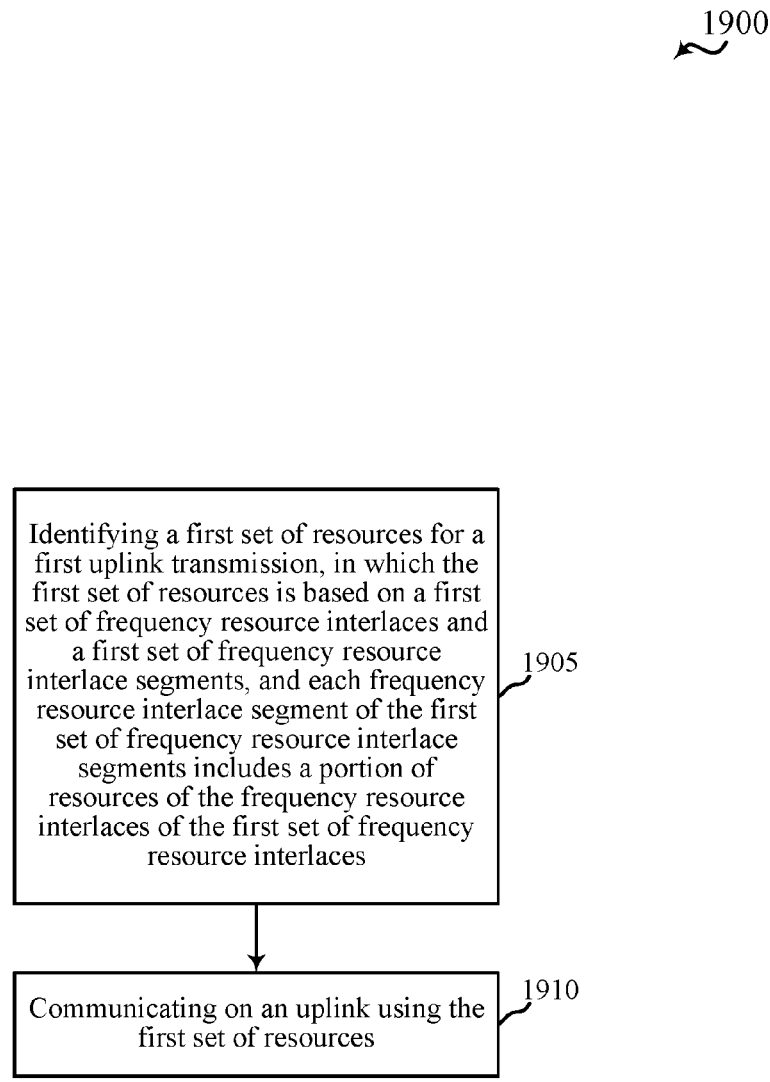
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the UEs 115, 215, 215-*a*, 215-*b*, or 1715 described with reference to FIG. 1, 2, or 17, aspects of one or more of the network access devices (or base stations 105, 205, 205-*a*, or 1805) described with reference to FIG. 1, 2, or 18, or aspects of one or more of the apparatuses 935, 1015, or 1105 described with reference to FIG. 9, 10, or 11. In some examples, a UE or network access device may execute one or more sets of codes to control the functional elements of the UE or network access device to perform the functions described below. Additionally or alternatively, the UE or network access device may perform one or more of the functions described below using special-purpose hardware.

At block 1905, the method 1900 may include identifying a first set of resources for a first uplink transmission. The first set of resources may be based on a first set of frequency resource interlaces and a first set of frequency resource interlace segments. Each frequency resource interlace segment of the first set of frequency resource interlace segments may include a portion of resources of the frequency resource interlaces of the first set of frequency resource interlaces. In some examples, the first uplink transmission may include: a PUSCH transmission, or a PUCCH transmission, or a PRACH transmission, or a SRS transmission, or a combination thereof. In some examples, the first set of resources may be in a shared radio frequency spectrum band. The shared radio frequency spectrum band may include a radio frequency spectrum band available for Wi-Fi use, a radio frequency spectrum band available for use by different radio access technologies, or a radio frequency spectrum band available for use by multiple MNOs in an equally shared or prioritized manner. The operation(s) at block 1905 may be performed using the wireless communication manager 920, 1020, or 1120 described with reference to FIG. 9, 10, or 11, the UE wireless communication manager 1750 descried with reference to FIG. 17, the base station wireless communication manager 1860 described with reference to FIG. 18, or the resource identifier 940, 1040, or 1140 described with reference to FIG. 9, 10, or 11.

In some examples of the method 1900, the first set of resources may include a first set of resource blocks. In some examples, each frequency resource interlace segment may include at least one resource in each of the frequency resource interlaces (e.g., as shown in FIG. 3, 4, or 5). In some examples, each of the frequency resource interlace segments may include a same number of resource blocks in each of the frequency resource interlaces (e.g., as shown in FIG. 4 or 5). In some examples, the frequency resource interlace segments may include one of: frequency resource interlace segments having equal numbers of resources blocks (as shown in FIG. 4), or frequency resource interlace segments having at least two different numbers of resource blocks. In some examples, the first set of frequency resource interlaces may include all frequency resource interlaces, and the first set of frequency resource interlace segments may include a subset of frequency resource interlace segments (e.g., as shown in FIG. 5 by the second set of resources including a last two frequency resource interlace segments of all six frequency resource interlaces).

At block 1910, the method 1900 may include communicating on an uplink using the first set of resources. The operation(s) at block 1910 may be performed using the wireless communication manager 920, 1020, or 1120 described with reference to FIG. 9, 10, or 11, the UE wireless communication manager 1750 descried with reference to FIG. 17, the base station wireless communication manager 1860 described with reference to FIG. 18, or the uplink communication manager 945, 1045, or 1145 described with reference to FIG. 9, 10, or 11.

Thus, the method 1900 may provide for wireless communication. It should be noted that the method 1900 is just one implementation and that the operations of the method 1900 may be rearranged or otherwise modified such that other implementations are possible.

Figure 20:
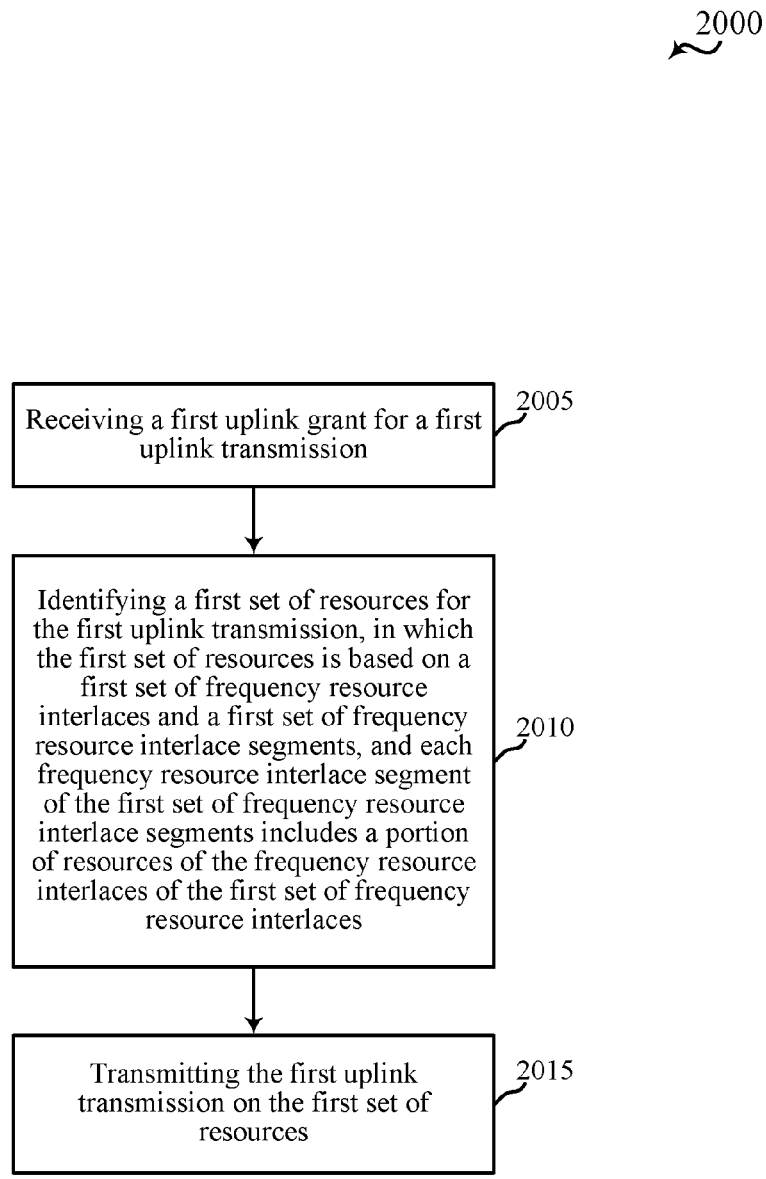
FIG. 20 is a flow chart illustrating an example of a method for wireless communication, in accordance with various aspects of the present disclosure.

FIG. 20 is a flow chart illustrating an example of a method 2000 for wireless communication, in accordance with various aspects of the present disclosure. For clarity, the method 2000 is described below with reference to aspects of one or more of the UEs 115, 215, 215-*a*, 215-*b*, or 1715 described with reference to FIG. 1, 2, or 17, or aspects of one or more of the apparatuses 935 or 1015 described with reference to FIG. 9 or 10. In some examples, a UE may execute one or more sets of codes to control the functional elements of the UE to perform the functions described below. Additionally or alternatively, the UE may perform one or more of the functions described below using special-purpose hardware.

At block 2005, the method 2000 may include receiving a first uplink grant for a first uplink transmission. In some examples, the first uplink transmission may include: a PUSCH transmission, or a PUCCH transmission, or a PRACH transmission, or a SRS transmission, or a combination thereof. The operation(s) at block 2005 may be performed using the wireless communication manager 920 or 1020 described with reference to FIG. 9 or 10, the UE wireless communication manager 1750 descried with reference to FIG. 17, or the uplink grant reception manager 1050 described with reference to FIG. 10.

At block 2010, the method 2000 may include identifying a first set of resources for the first uplink transmission. In some examples, the first set of resources for the first uplink transmission may be identified in the first uplink grant received at block 2005. In some examples, the first set of resources for the first uplink transmission may be identified in a field of the first uplink grant. The field may include one bit per frequency resource interlace and one bit per frequency resource interlace segment. The first set of resources may be based on a first set of frequency resource interlaces and a first set of frequency resource interlace segments. Each frequency resource interlace segment of the first set of frequency resource interlace segments may include a portion of resources of the frequency resource interlaces of the first set of frequency resource interlaces. In some examples, the first set of resources may be in a shared radio frequency spectrum band. The shared radio frequency spectrum band may include a radio frequency spectrum band available for Wi-Fi use, a radio frequency spectrum band available for use by different radio access technologies, or a radio frequency spectrum band available for use by multiple MNOs in an equally shared or prioritized manner. The operation(s) at block 2010 may be performed using the wireless communication manager 920 or 1020 described with reference to FIG. 9 or 10, the UE wireless communication manager 1750 descried with reference to FIG. 17, or the resource identifier 940 or 1040 described with reference to FIG. 9 or 10.

In some examples of the method 2000, the first set of resources may include a first set of resource blocks. In some examples, each frequency resource interlace segment may include at least one resource in each of the frequency resource interlaces (e.g., as shown in FIG. 3, 4, or 5). In some examples, each of the frequency resource interlace segments may include a same number of resource blocks in each of the frequency resource interlaces (e.g., as shown in FIG. 4 or 5). In some examples, the frequency resource interlace segments may include one of: frequency resource interlace segments having equal numbers of resources blocks (as shown in FIG. 4), or frequency resource interlace segments having at least two different numbers of resource blocks. In some examples, the first set of frequency resource interlaces may include all frequency resource interlaces, and the first set of frequency resource interlace segments may include a subset of frequency resource interlace segments (e.g., as shown in FIG. 5 by the second set of resources including a last two frequency resource interlace segments of all six frequency resource interlaces).

At block 2015, the method 2000 may include communicating on an uplink using the first set of resources (e.g., transmitting the first uplink transmission on the first set of resources of the uplink). The operation(s) at block 2015 may be performed using the wireless communication manager 920 or 1020 described with reference to FIG. 9 or 10, the UE wireless communication manager 1750 descried with reference to FIG. 17, the uplink communication manager 945 or 1045 described with reference to FIG. 9 or 10, or the uplink transmission manager 1055 described with reference to FIG. 10.

Thus, the method 2000 may provide for wireless communication. It should be noted that the method 2000 is just one implementation and that the operations of the method 2000 may be rearranged or otherwise modified such that other implementations are possible.

Figure 21:
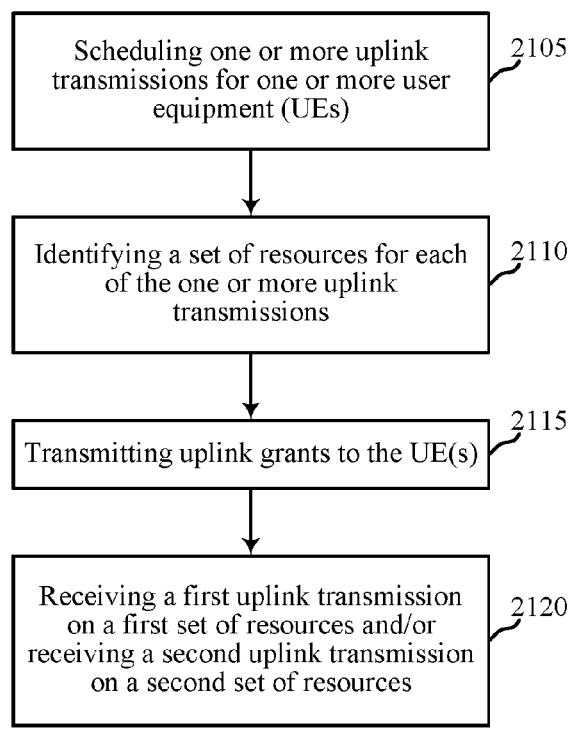
FIG. 21 is a flow chart illustrating an example of a method for wireless communication, in accordance with various aspects of the present disclosure.

FIG. 21 is a flow chart illustrating an example of a method 2100 for wireless communication, in accordance with various aspects of the present disclosure. For clarity, the method 2100 is described below with reference to aspects of one or more of the network access devices (or base stations 105, 205, 205-a, or 1805) described with reference to FIG. 1, 2, or 18, or aspects of one or more of the apparatuses 935 or 1105 described with reference to FIG. 9 or 11. In some examples, a network access device may execute one or more sets of codes to control the functional elements of the network access device to perform the functions described below. Additionally or alternatively, the network access device may perform one or more of the functions described below using special-purpose hardware.

At block 2105, the method 2100 may include scheduling one or more uplink transmissions for one or more UEs. In some examples, the operations at block 2105 may include scheduling a first uplink transmission of a first UE and/or a second uplink transmission of a second UE. The second uplink transmission may be scheduled for a same TTI as the first uplink transmission. In some examples, each of the first uplink transmission and/or the second uplink transmission may include: a PUSCH transmission, or a PUCCH transmission, or a PRACH transmission, or a SRS transmission, or a combination thereof. The operation(s) at block 2105 may be performed using the wireless communication manager 920 or 1120 described with reference to FIG. 9 or 11, the base station wireless communication manager 1860 described with reference to FIG. 18, or the uplink transmission scheduler 1160 described with reference to FIG. 11.

At block 2110, the method 2100 may include identifying a set of resources for each of the one or more uplink transmissions scheduled at block 2105. In some examples, the operations at block 2110 may include identifying a first set of resources for the first uplink transmission and/or a second set of resources for the second uplink transmission. In some examples, the first set of resources for the first uplink transmission may be identified in (e.g., selected and incorporated into) a first uplink grant for the first uplink transmission, and/or the second set of resources for the second uplink transmission may be identified in (e.g., selected and incorporated into) a second uplink grant for the second uplink transmission. In some examples, the first set of resources for the first uplink transmission may be identified in a field of the first uplink grant and/or the second set of resources for the second uplink transmission may be identified in a field of the second uplink grant. Each of the fields may include one bit per frequency resource interlace and one bit per frequency resource interlace segment. The first set of resources may be based on a first set of frequency resource interlaces and a first set of frequency resource interlace segments. Each frequency resource interlace segment of the first set of frequency resource interlace segments may include a portion of resources of the frequency resource interlaces of the first set of frequency resource interlaces. The second set of resources may be based on a second set of frequency resource interlaces and a second set of frequency resource interlace segments. Each frequency resource interlace segment of the second set of frequency resource interlace segments may include a portion of resources of the frequency resource interlaces of the second set of frequency resource interlaces. In some examples, the first set of resources and/or the second set of resources may be in a shared radio frequency spectrum band. The shared radio frequency spectrum band may include a radio frequency spectrum band available for Wi-Fi use, a radio frequency spectrum band available for use by different radio access technologies, or a radio frequency spectrum band available for use by multiple MNOs in an equally shared or prioritized manner. The operation(s) at block 2110 may be performed using the wireless communication manager 920 or 1120 described with reference to FIG. 9 or 11, the base station wireless communication manager 1860 described with reference to FIG. 18, or the resource identifier 940 or 1140 described with reference to FIG. 9 or 11.

In some examples of the method 2100, the first set of resources may include a first set of resource blocks and/or the second set of resources may include a second set of resource blocks. In some examples, each frequency resource interlace segment may include at least one resource in each of the frequency resource interlaces (e.g., as shown in FIG. 3, 4, or 5). In some examples, each of the frequency resource interlace segments may include a same number of resource blocks in each of the frequency resource interlaces (e.g., as shown in FIG. 4 or 5). In some examples, the frequency resource interlace segments may include one of: frequency resource interlace segments having equal numbers of resources blocks (as shown in FIG. 4), or frequency resource interlace segments having at least two different numbers of resource blocks.

In some examples, the first set of frequency resource interlaces may include all frequency resource interlaces, and the first set of frequency resource interlace segments may include a subset of frequency resource interlace segments (e.g., as shown in FIG. 5 by the second set of resources including the last two (of four) frequency resource interlace segments of all six frequency resource interlaces). In some examples, the second set of frequency resource interlaces may include a subset of the frequency resource interlaces (e.g., as shown in FIG. 5 by the first set of resources including the first (of four) frequency resource interlace segment of the first four (of six) frequency resource interlaces).

At block 2115, the method 2100 may include transmitting uplink grants to the UE(s). In some examples, the operations at block 2115 may include transmitting the first uplink grant for the first uplink transmission to the first UE and/or transmitting the second uplink grant for the second uplink transmission to the second UE. The operation(s) at block 2115 may be performed using the wireless communication manager 920 or 1120 described with reference to FIG. 9 or 11, the base station wireless communication manager 1860 described with reference to FIG. 18, or the uplink grant transmission manager 1150 described with reference to FIG. 11.

At block 2120, the method 2100 may include communicating on an uplink using the first set of resources and/or the second set of resources (e.g., receiving the first uplink transmission on the first set of resources of the uplink and/or receiving the second uplink transmission on the second set of resources of the uplink). The operation(s) at block 2120 may be performed using the wireless communication manager 920 or 1120 described with reference to FIG. 9 or 11, the base station wireless communication manager 1860 described with reference to FIG. 18, the uplink communication manager 945 or 1145 described with reference to FIG. 9 or 11, or the uplink reception manager 1155 described with reference to FIG. 11.

Thus, the method 2100 may provide for wireless communication. It should be noted that the method 2100 is just one implementation and that the operations of the method 2100 may be rearranged or otherwise modified such that other implementations are possible.

Figure 22:
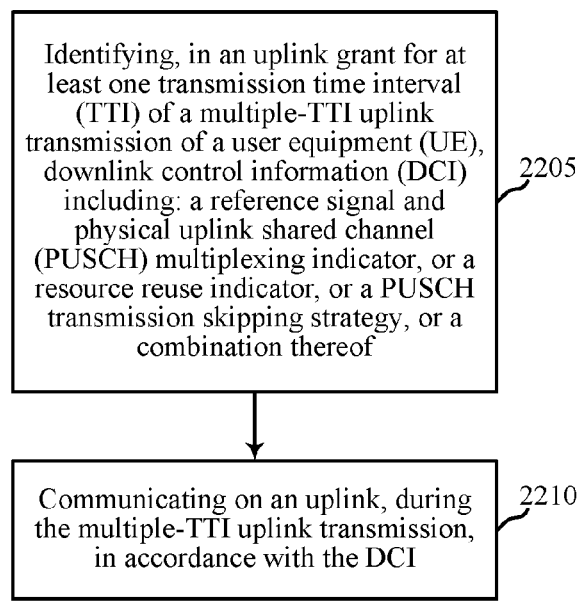
FIG. 22 is a flow chart illustrating an example of a method for wireless communication, in accordance with various aspects of the present disclosure.

FIG. 22 is a flow chart illustrating an example of a method 2200 for wireless communication, in accordance with various aspects of the present disclosure. For clarity, the method 2200 is described below with reference to aspects of one or more of the UEs 115, 215, 215-*a*, 215-*b*, or 1715 described with reference to FIG. 1, 2, or 17, aspects of one or more of the network access devices (or base stations 105, 205, 205-*a*, or 1805) described with reference to FIG. 1, 2, or 18, or aspects of one or more of the apparatuses 1235, 1315, or 1405 described with reference to FIG. 12, 13, or 14. In some examples, a UE or network access device may execute one or more sets of codes to control the functional elements of the UE or network access device to perform the functions described below. Additionally or alternatively, the UE or network access device may perform one or more of the functions described below using special-purpose hardware.

At block 2205, the method 2200 may include identifying, in an uplink grant for at least one TTI of a multiple-TTI uplink transmission of a UE, DCI including: a reference signal and PUSCH multiplexing indicator, or a resource reuse indicator, or a PUSCH transmission skipping strategy, or a combination thereof. In some examples, the multiple-TTI uplink transmission may include an uplink transmission in a shared radio frequency spectrum band. The shared radio frequency spectrum band may include a radio frequency spectrum band available for Wi-Fi use, a radio frequency spectrum band available for use by different radio access technologies, or a radio frequency spectrum band available for use by multiple MNOs in an equally shared or prioritized manner. The operation(s) at block 2205 may be performed using the wireless communication manager 1220, 1320, or 1420 described with reference to FIG. 12, 13, or 14, the UE wireless communication manager 1750 descried with reference to FIG. 17, the base station wireless communication manager 1860 described with reference to FIG. 18, or the DCI manager 1240, 1340, or 1440 described with reference to FIG. 12, 13, or 14.

At block 2210, the method 2200 may include communicating on an uplink, during the multiple-TTI uplink transmission, in accordance with the DCI. The operation(s) at block 2210 may be performed using the wireless communication manager 1220, 1320, or 1420 described with reference to FIG. 12, 13, or 14, the UE wireless communication manager 1750 descried with reference to FIG. 17, the base station wireless communication manager 1860 described with reference to FIG. 18, or the multiple-TTI uplink communication manager 1245, 1345, or 1445 described with reference to FIG. 12, 13, or 14.

Thus, the method 2200 may provide for wireless communication. It should be noted that the method 2200 is just one implementation and that the operations of the method 2200 may be rearranged or otherwise modified such that other implementations are possible.

Figure 23:
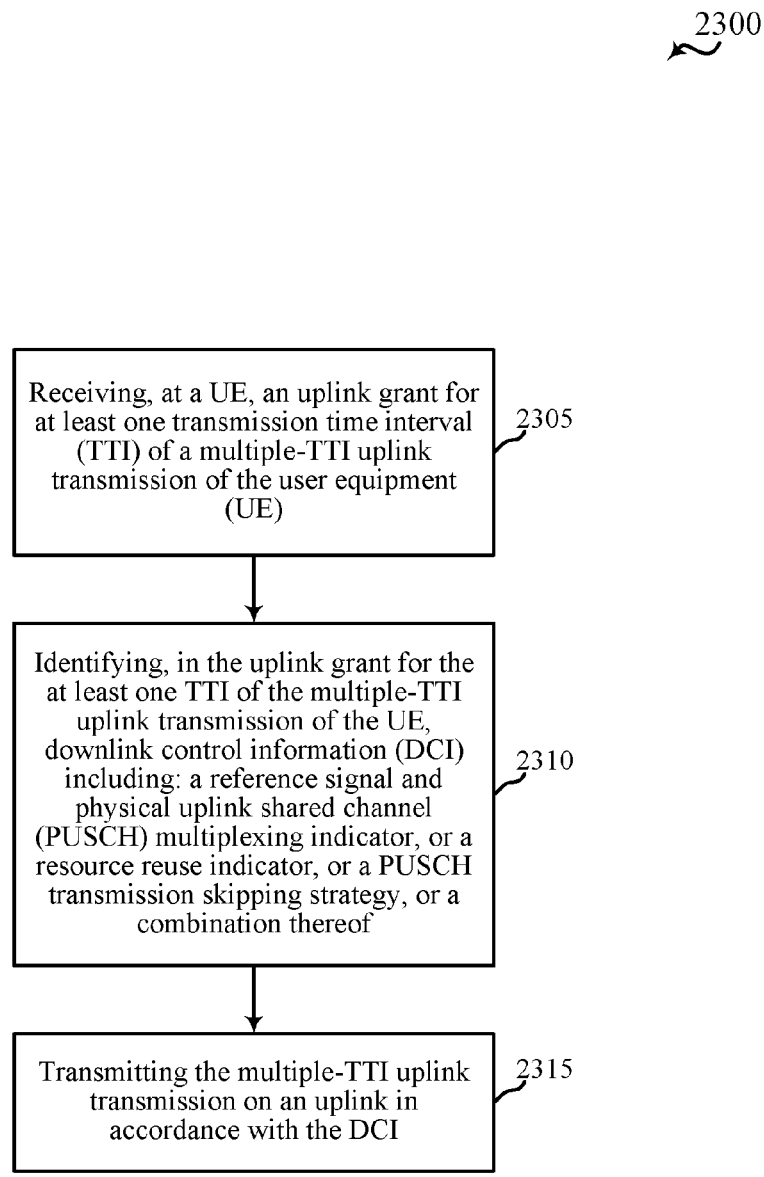
FIG. 23 is a flow chart illustrating an example of a method for wireless communication, in accordance with various aspects of the present disclosure.

FIG. 23 is a flow chart illustrating an example of a method 2300 for wireless communication, in accordance with various aspects of the present disclosure. For clarity, the method 2300 is described below with reference to aspects of one or more of the UEs 115, 215, 215-*a*, 215-*b*, or 1715 described with reference to FIG. 1, 2, or 17, or aspects of one or more of the apparatuses 1235 or 1315 described with reference to FIG. 12 or 13. In some examples, a UE may execute one or more sets of codes to control the functional elements of the UE to perform the functions described below. Additionally or alternatively, the UE may perform one or more of the functions described below using special-purpose hardware.

At block 2305, the method 2300 may include receiving, at a UE, an uplink grant for at least one TTI of a multiple-TTI uplink transmission of the UE. In some examples, the multiple-TTI uplink transmission may include an uplink transmission in a shared radio frequency spectrum band. The shared radio frequency spectrum band may include a radio frequency spectrum band available for Wi-Fi use, a radio frequency spectrum band available for use by different radio access technologies, or a radio frequency spectrum band available for use by multiple MNOs in an equally shared or prioritized manner. The operation(s) at block 2305 may be performed using the wireless communication manager 1220 or 1320 described with reference to FIG. 12 or 13, the UE wireless communication manager 1750 descried with reference to FIG. 17, or the multiple-TTI uplink grant reception manager 1350 described with reference to FIG. 13.

At block 2310, the method 2300 may include identifying, in the uplink grant for the at least one TTI of the multiple-TTI uplink transmission of the UE, DCI including: a reference signal and PUSCH multiplexing indicator, or a resource reuse indicator, or a PUSCH transmission skipping strategy, or a combination thereof. The operation(s) at block 2310 may be performed using the wireless communication manager 1220 or 1320 described with reference to FIG. 12 or 13, the UE wireless communication manager 1750 descried with reference to FIG. 17, or the DCI manager 1240 or 1340 described with reference to FIG. 12 or 13.

In some examples of the method 2300, the reference signal and PUSCH multiplexing indicator may indicate to the UE to: not transmit a SRS and begin a PUSCH transmission during a first symbol period following a successful performance of a LBT procedure; or transmit the SRS during the first symbol period and begin the PUSCH transmission during a second symbol period temporally following the first symbol period; or transmit a junk SRS during the first symbol period and begin the PUSCH transmission during the second symbol period.

In some examples of the method 2300, the resource reuse indicator may indicate to the UE whether at least one of PUCCH resources or PRACH resources are reallocated as PUSCH resources.

In some examples of the method 2300, the PUSCH transmission skipping strategy may indicate to the UE whether to skip at least a temporally first PUSCH transmission or at least a temporally last PUSCH transmission when a LBT procedure for at least a first TTI is not successful.

In some examples of the method 2300, the DCI may, additionally or alternatively, include a current transmission burst index and a target transmission burst index. The current transmission burst index may identify a first transmission burst in which the uplink grant is transmitted. The target transmission burst index may identify a second transmission burst to which the uplink grant applies. In some examples, the DCI may, additionally or alternatively, include an uplink index identifying an uplink TTI in the second transmission burst in which a PUSCH transmission begins.

At block 2315, the method 2300 may include communicating on an uplink (e.g., transmitting the multiple-TTI uplink transmission on the uplink), during the multiple-TTI uplink transmission, in accordance with the DCI. The operation(s) at block 2315 may be performed using the wireless communication manager 1220 or 1320 described with reference to FIG. 12 or 13, the UE wireless communication manager 1750 descried with reference to FIG. 17, the multiple-TTI uplink communication manager 1245 or 1345 described with reference to FIG. 12 or 13, or the multiple-TTI uplink transmission manager 1380 described with reference to FIG. 14.

Thus, the method 2300 may provide for wireless communication. It should be noted that the method 2300 is just one implementation and that the operations of the method 2300 may be rearranged or otherwise modified such that other implementations are possible.

Figure 24:
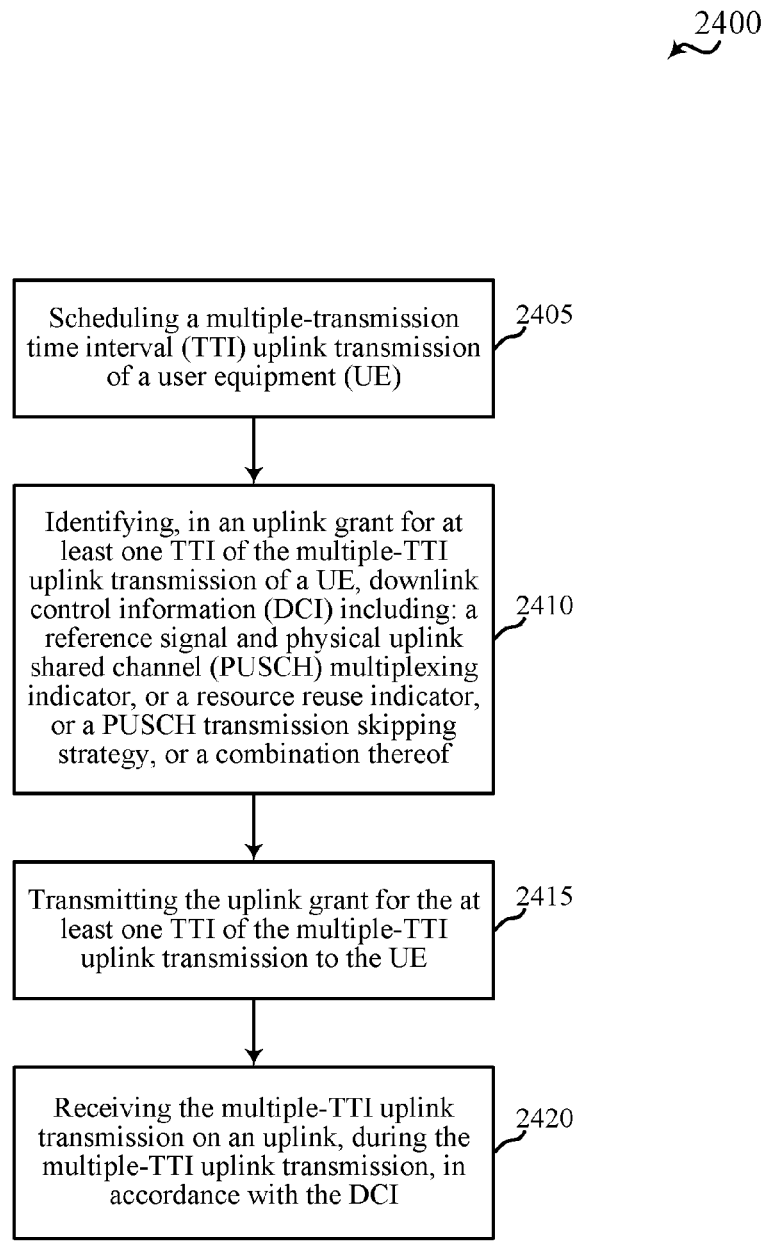
FIG. 24 is a flow chart illustrating an example of a method for wireless communication, in accordance with various aspects of the present disclosure.

FIG. 24 is a flow chart illustrating an example of a method 2400 for wireless communication, in accordance with various aspects of the present disclosure. For clarity, the method 2400 is described below with reference to aspects of one or more of the network access devices (or base stations 105, 205, 205-a, or 1805) described with reference to FIG. 1, 2, or 18, or aspects of one or more of the apparatuses 1235 or 1405 described with reference to FIG. 12 or 14. In some examples, a network access device may execute one or more sets of codes to control the functional elements of the network access device to perform the functions described below. Additionally or alternatively, the network access device may perform one or more of the functions described below using special-purpose hardware.

At block 2405, the method 2400 may include scheduling a multiple-TTI uplink transmission of a UE. In some examples, the multiple-TTI uplink transmission may include an uplink transmission in a shared radio frequency spectrum band. The shared radio frequency spectrum band may include a radio frequency spectrum band available for Wi-Fi use, a radio frequency spectrum band available for use by different radio access technologies, or a radio frequency spectrum band available for use by multiple MNOs in an equally shared or prioritized manner. The operation(s) at block 2405 may be performed using the wireless communication manager 1220 or 1420 described with reference to FIG. 12 or 14, the base station wireless communication manager 1860 described with reference to FIG. 18, or the multiple-TTI uplink transmission scheduler 1485 described with reference to FIG. 14.

At block 2410, the method 2400 may include identifying, in an uplink grant for at least one TTI of the multiple-TTI uplink transmission of the UE, DCI including: a reference signal and PUSCH multiplexing indicator, or a resource reuse indicator, or a PUSCH transmission skipping strategy, or a combination thereof. In some examples, identifying the DCI may include selecting the DCI and incorporating the DCI into the uplink grant or another transmission. The operation(s) at block 2410 may be performed using the wireless communication manager 1220 or 1420 described with reference to FIG. 12 or 14, the base station wireless communication manager 1860 described with reference to FIG. 18, or the DCI manager 1240 or 1440 described with reference to FIG. 12 or 14.

In some examples of the method 2400, the reference signal and PUSCH multiplexing indicator may indicate to the UE to: not transmit a SRS and begin a PUSCH transmission during a first symbol period following a successful performance of a LBT procedure; or transmit the SRS during the first symbol period and begin the PUSCH transmission during a second symbol period temporally following the first symbol period; or transmit a junk SRS during the first symbol period and begin the PUSCH transmission during the second symbol period.

In some examples of the method 2400, the resource reuse indicator may indicate to the UE whether at least one of PUCCH resources or PRACH resources are reallocated as PUSCH resources.

In some examples of the method 2400, the PUSCH transmission skipping strategy may indicate to the UE whether to skip at least a temporally first PUSCH transmission or at least a temporally last PUSCH transmission when a LBT procedure for at least a first TTI is not successful.

In some examples of the method 2400, the DCI may, additionally or alternatively, include a current transmission burst index and a target transmission burst index. The current transmission burst index may identify a first transmission burst in which the uplink grant is transmitted. The target transmission burst index may identify a second transmission burst to which the uplink grant applies. In some examples, the DCI may, additionally or alternatively, include an uplink index identifying an uplink TTI in the second transmission burst in which a PUSCH transmission begins. In some examples, the method 2400 may also or alternatively broadcast the current transmission burst index to a plurality of UEs. In some examples, the current transmission burst index may be broadcast to the plurality of UEs in DCI on a common PDCCH receivable by the plurality of UEs.

At block 2415, the method 2400 may include transmitting the uplink grant for the at least one TTI of the multiple-TTI uplink transmission to the UE. The operation(s) at block 2415 may be performed using the wireless communication manager 1220 or 1420 described with reference to FIG. 12 or 14, the base station wireless communication manager 1860 described with reference to FIG. 18, or the multiple-TTI uplink grant transmission manager 1450 described with reference to FIG. 14.

At block 2420, the method 2400 may include communicating on an uplink (e.g., receiving the multiple-TTI uplink transmission on the uplink), during the multiple-TTI uplink transmission, in accordance with the DCI. The operation(s) at block 2420 may be performed using the wireless communication manager 1220 or 1420 described with reference to FIG. 12 or 14, the base station wireless communication manager 1860 descried with reference to FIG. 18, the multiple-TTI uplink communication manager 1245 or 1445 described with reference to FIG. 12 or 14, or the multiple-TTI uplink reception manager 1480 described with reference to FIG. 14.

Thus, the method 2400 may provide for wireless communication. It should be noted that the method 2400 is just one implementation and that the operations of the method 2400 may be rearranged or otherwise modified such that other implementations are possible.

Figure 25:
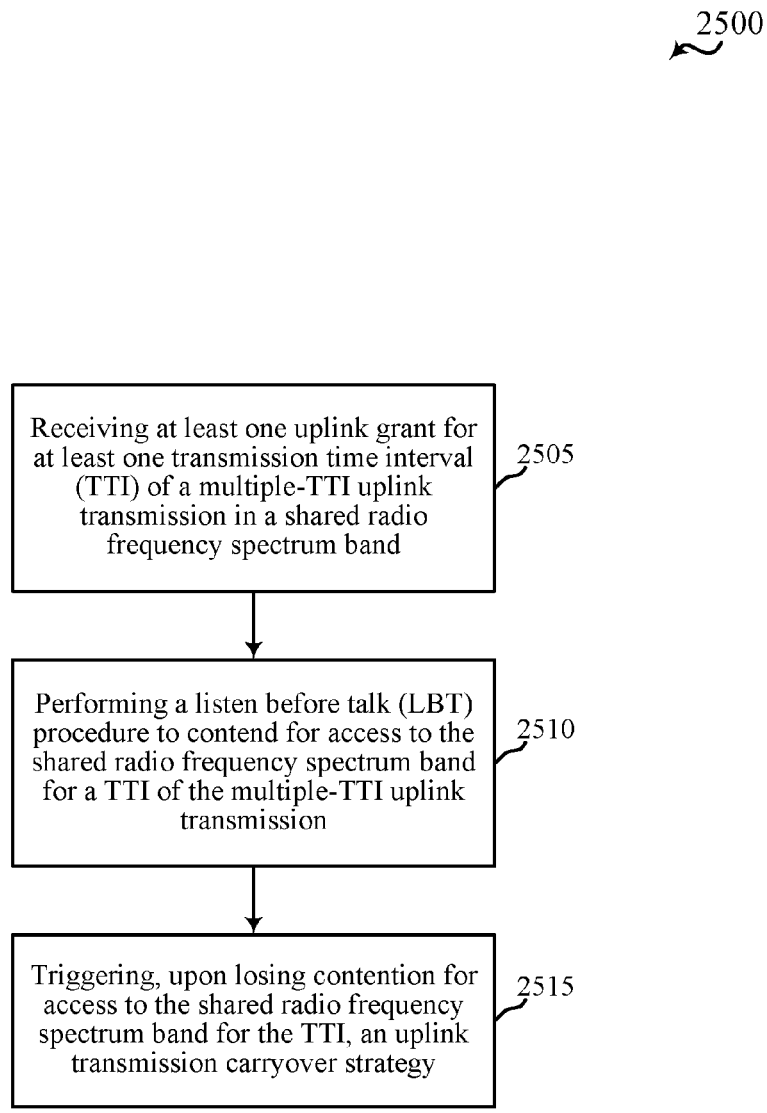
FIG. 25 is a flow chart illustrating an example of a method for wireless communication at a UE, in accordance with various aspects of the present disclosure.

FIG. 25 is a flow chart illustrating an example of a method 2500 for wireless communication at a UE, in accordance with various aspects of the present disclosure. For clarity, the method 2500 is described below with reference to aspects of one or more of the UEs 115, 215, 215-*a*, 215-*b*, or 1715 described with reference to FIG. 1, 2, or 17, or aspects of the apparatus 1515 described with reference to FIG. 15. In some examples, a UE may execute one or more sets of codes to control the functional elements of the UE to perform the functions described below. Additionally or alternatively, the UE may perform one or more of the functions described below using special-purpose hardware.

At block 2505, the method 2500 may include receiving at least one uplink grant for at least one TTI of a multiple-TTI uplink transmission in a shared radio frequency spectrum band. The shared radio frequency spectrum band may include a radio frequency spectrum band available for Wi-Fi use, a radio frequency spectrum band available for use by different radio access technologies, or a radio frequency spectrum band available for use by multiple MNOs in an equally shared or prioritized manner. The operation(s) at block 2505 may be performed using the wireless communication manager 1520 described with reference to FIG. 15, the UE wireless communication manager 1750 descried with reference to FIG. 17, or the uplink grant manager 1540 described with reference to FIG. 15.

At block 2510, the method 2500 may include performing a LBT procedure to contend for access to the shared radio frequency spectrum band for a TTI of the multiple-TTI uplink transmission. The operation(s) at block 2510 may be performed using the wireless communication manager 1520 described with reference to FIG. 15, the UE wireless communication manager 1750 descried with reference to FIG. 17, or the LBT procedure manager 1545 described with reference to FIG. 15.

At block 2515, the method 2500 may include triggering, upon losing contention for access to the shared radio frequency spectrum band for the TTI, an uplink transmission carryover strategy. The operation(s) at block 2515 may be performed using the wireless communication manager 1520 described with reference to FIG. 15, the UE wireless communication manager 1750 descried with reference to FIG. 17, or the uplink transmission carryover strategy manager 1550 described with reference to FIG. 15.

In some examples of the method 2500, the uplink transmission carryover strategy may indicate to the UE to carryover or not carryover, to a next TTI of the multiple-TTI uplink transmission, a parameter associated with the TTI for which contention for access to the shared radio frequency spectrum band is lost. In some examples, the parameter may include at least one of: a CSI transmission parameter, or a SRS transmission parameter, or a TPC command, or a combination thereof.

Thus, the method 2500 may provide for wireless communication. It should be noted that the method 2500 is just one implementation and that the operations of the method 2500 may be rearranged or otherwise modified such that other implementations are possible.

Figure 26:
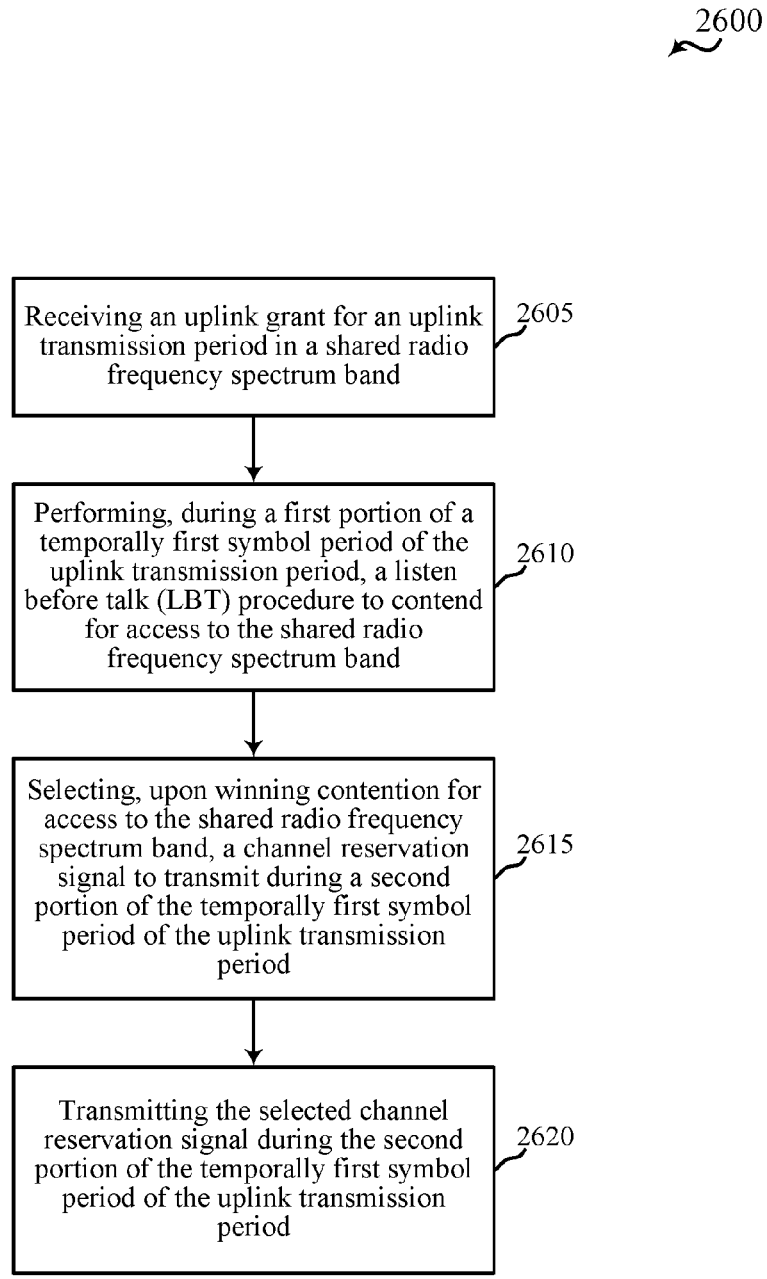
FIG. 26 is a flow chart illustrating an example of a method for wireless communication at a UE, in accordance with various aspects of the present disclosure.

FIG. 26 is a flow chart illustrating an example of a method 2600 for wireless communication at a UE, in accordance with various aspects of the present disclosure. For clarity, the method 2600 is described below with reference to aspects of one or more of the UEs 115, 215, 215-*a*, 215-*b*, or 1715 described with reference to FIG. 1, 2, or 17, or aspects of one or more of the apparatuses 1615 described with reference to FIG. 16. In some examples, a UE may execute one or more sets of codes to control the functional elements of the UE to perform the functions described below. Additionally or alternatively, the UE may perform one or more of the functions described below using special-purpose hardware.

At block 2605, the method 2600 may include receiving an uplink grant for an uplink transmission period in a shared radio frequency spectrum band. The shared radio frequency spectrum band may include a radio frequency spectrum band available for Wi-Fi use, a radio frequency spectrum band available for use by different radio access technologies, or a radio frequency spectrum band available for use by multiple MNOs in an equally shared or prioritized manner. The operation(s) at block 2605 may be performed using the wireless communication manager 1620 described with reference to FIG. 16, the UE wireless communication manager 1750 descried with reference to FIG. 17, or the uplink grant manager 1640 described with reference to FIG. 16.

At block 2610, the method 2600 may include performing, during a first portion of a temporally first symbol period of the uplink transmission period, a LBT procedure to contend for access to the shared radio frequency spectrum band. The operation(s) at block 2610 may be performed using the wireless communication manager 1620 described with reference to FIG. 16, the UE wireless communication manager 1750 descried with reference to FIG. 17, or the LBT procedure manager 1645 described with reference to FIG. 16.

At block 2615, the method 2600 may include selecting, upon winning contention for access to the shared radio frequency spectrum band, a channel reservation signal to transmit during a second portion of the temporally first symbol period of the uplink transmission period. The operation(s) at block 2615 may be performed using the wireless communication manager 1620 described with reference to FIG. 16, the UE wireless communication manager 1750 descried with reference to FIG. 17, or the channel reservation signal selector 1650 described with reference to FIG. 16.

When the UE is scheduled to transmit a SRS before a PUSCH during the uplink transmission period, the channel reservation signal selected at block 2615 may include a SRS waveform. When the UE is scheduled to transmit a PUSCH but not a SRS during the uplink transmission period, and when a junk SRS interface is active during the temporally first symbol period of the uplink transmission period, the channel reservation signal selected at block 2615 may include a junk SRS waveform. When a network access device that transmits the uplink grant does not indicate a selection methodology for selecting the channel reservation signal, the channel reservation signal selected at block 2615 may include a Wi-Fi channel reservation signal (e.g., a CTS2S).

At block 2620, the method 2600 may include transmitting the selected channel reservation signal during the second portion of the temporally first symbol period of the uplink transmission period. The operation(s) at block 2620 may be performed using the wireless communication manager 1620 described with reference to FIG. 16, the UE wireless communication manager 1750 descried with reference to FIG. 17, or the channel reservation signal transmission manager 1655 described with reference to FIG. 16.

Thus, the method 2600 may provide for wireless communication. It should be noted that the method 2600 is just one implementation and that the operations of the method 2600 may be rearranged or otherwise modified such that other implementations are possible.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed spectrum. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication, comprising:
  receiving a first uplink grant for a first uplink transmission;
  identifying a first set of resources for the first uplink transmission based at least in part on the first uplink grant, wherein the first set of resources is based at least in part on a first set of frequency resource interlaces and a first set of frequency resource interlace segments, each frequency resource interlace segment of the first set of frequency resource interlace segments comprises a portion of resources of the frequency resource interlaces of the first set of frequency resource interlaces, and the first uplink grant provides a first indication of at least one frequency resource interlace from the first set of frequency resource interlaces and a second indication of at least one frequency resource interlace segment from the first set of frequency resource interlace segments to identify the first set of resources for the first uplink transmission; and communicating on an uplink using the first set of resources.

2. The method of claim 1, wherein the first indication and the second indication are identified in a field of the first uplink grant comprising one bit per frequency resource interlace and one bit per frequency resource interlace segment.

3. The method of claim 1, further comprising:
scheduling the first uplink transmission of a first UE; and
transmitting a first uplink grant for the first uplink transmission to the first UE;
wherein the first set of resources for the first uplink transmission is identified in the first uplink grant for the first uplink transmission.

4. The method of claim 3, further comprising:
scheduling a second uplink transmission of a second UE, the second uplink transmission scheduled for a same transmission time interval (TTI) as the first uplink transmission;
identifying a second set of resources for the second uplink transmission, wherein the second set of resources is based at least in part on a second set of frequency resource interlaces and a second set of frequency resource interlace segments, and each frequency resource interlace segment of the second set of frequency resource interlace segments comprises a portion of resources of the frequency resource interlaces of the second set of frequency resource interlaces; and
transmitting a second uplink grant for the second uplink transmission to the second UE;
wherein the second set of resources for the second uplink transmission is identified in the second uplink grant for the second uplink transmission.

5. The method of claim 4, wherein the first set of frequency resource interlaces comprises all frequency resource interlaces, the first set of frequency resource interlace segments comprises a subset of frequency resource interlace segments, and the second set of frequency resource interlaces comprises a subset of the frequency resource interlaces.

6. The method of claim 1, wherein each frequency resource interlace segment comprises at least one resource in each of the frequency resource interlaces.

7. The method of claim 1, wherein the first set of resources comprises a first set of resource blocks.

8. The method of claim 1, wherein each of the frequency resource interlace segments comprises a same number of resource blocks in each of the frequency resource interlaces.

9. The method of claim 1, wherein the first set of frequency resource interlaces comprises all frequency resource interlaces, and the first set of frequency resource interlace segments comprises a subset of frequency resource interlace segments.

10. The method of claim 1, wherein the frequency resource interlace segments comprise one of:
frequency resource interlace segments having equal numbers of resources blocks, or frequency resource interlace segments having at least two different numbers of resource blocks.

11. The method of claim 1, wherein the first uplink transmission comprises:
a physical uplink shared channel (PUSCH) transmission, or a physical uplink control channel (PUCCH) transmission, or a physical random access channel (PRACH) transmission, or a sounding reference signal (SRS) transmission, or a combination thereof.

12. The method of claim 1, wherein the first set of resources is in a shared radio frequency spectrum band.

13. An apparatus for wireless communication, comprising:
a processor;
memory in electronic communication with the processor; and
instructions stored in the memory and operable, when executed by the processor, to cause the apparatus to:
receive a first uplink grant for a first uplink transmission;
identify a first set of resources for the first uplink transmission based at least in part on the first uplink grant, wherein the first set of resources is based at least in part on a first set of frequency resource interlaces and a first set of frequency resource interlace segments, each frequency resource interlace segment of the first set of frequency resource interlace segments comprises a portion of resources of the frequency resource interlaces of the first set of frequency resource interlaces, and the first uplink grant provides a first indication of at least one frequency resource interlace from the first set of frequency resource interlaces and a second indication of at least one frequency resource interlace segment from the first set of frequency resource interlace segments to identify the first set of resources for the first uplink transmission; and
communicate on an uplink using the first set of resources.

14. The apparatus of claim 13, wherein the first indication and the second indication are identified in a field of the first uplink grant comprising one bit per frequency resource interlace and one bit per frequency resource interlace segment.

15. The apparatus of claim 13, wherein the instructions, when executed by the processor, are further configured to cause the apparatus to:
schedule the first uplink transmission of a first UE; and
transmit a first uplink grant for the first uplink transmission to the first UE;
wherein the first set of resources for the first uplink transmission is identified in the first uplink grant for the first uplink transmission.

16. The apparatus of claim 13, wherein the instructions, when executed by the processor, are further configured to cause the apparatus to:
schedule a second uplink transmission of a second UE, the second uplink transmission scheduled for a same transmission time interval (TTI) as the first uplink transmission;
identify a second set of resources for the second uplink transmission, wherein the second set of resources is based at least in part on a second set of frequency resource interlaces and a second set of frequency resource interlace segments, and each frequency resource interlace segment of the second set of frequency resource interlace segments comprises a portion of resources of the frequency resource interlaces of the second set of frequency resource interlaces; and transmit a second uplink grant for the second uplink transmission to the second UE;

wherein the second set of resources for the second uplink transmission is identified in the second uplink grant for the second uplink transmission.

17. The apparatus of claim 16, wherein the first set of frequency resource interlaces comprises all frequency resource interlaces, the first set of frequency resource interlace segments comprises a subset of frequency resource interlace segments, and the second set of frequency resource interlaces comprises a subset of the frequency resource interlaces.

18. The apparatus of claim 13, wherein each frequency resource interlace segment comprises at least one resource in each of the frequency resource interlaces.

19. The apparatus of claim 13, wherein the first set of resources comprises a first set of resource blocks.

20. The apparatus of claim 13, wherein each of the frequency resource interlace segments comprises a same number of resource blocks in each of the frequency resource interlaces.

21. The apparatus of claim 13, wherein the first set of frequency resource interlaces comprises all frequency resource interlaces, and the first set of frequency resource interlace segments comprises a subset of frequency resource interlace segments.

22. The apparatus of claim 13, wherein the frequency resource interlace segments comprise one of:

frequency resource interlace segments having equal numbers of resources blocks, or frequency resource interlace segments having at least two different numbers of resource blocks.

23. The apparatus of claim 13, wherein the first uplink transmission comprises:

a physical uplink shared channel (PUSCH) transmission, or a physical uplink control channel (PUCCH) transmission, or a physical random access channel (PRACH) transmission, or a sounding reference signal (SRS) transmission, or a combination thereof.

24. The apparatus of claim 13, wherein the first set of resources is in a shared radio frequency spectrum band.

* * * * *